United States Patent
Mahdi et al.

(10) Patent No.: US 8,687,593 B2
(45) Date of Patent: Apr. 1, 2014

(54) SYSTEM AND METHOD FOR MULTIMEDIA SHARING IN A COLLABORATIVE SESSION

(75) Inventors: Kaniz Mahdi, Carrollton, TX (US); Hua Cheng, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 276 days.

(21) Appl. No.: 12/860,286

(22) Filed: Aug. 20, 2010

(65) Prior Publication Data

US 2011/0053571 A1 Mar. 3, 2011

Related U.S. Application Data

(60) Provisional application No. 61/237,955, filed on Aug. 28, 2009.

(51) Int. Cl.
*H04W 4/00* (2009.01)

(52) U.S. Cl.
USPC ........ 370/331; 370/395.2; 370/401; 455/436; 455/445; 455/450

(58) Field of Classification Search
USPC ................ 370/331, 395.2, 400, 401; 455/450
See application file for complete search history.

(56) References Cited

U.S. PATENT DOCUMENTS

| | | | |
|---|---|---|---|
| 7,180,912 B1 | 2/2007 | Samarasinghe | |
| 2005/0071440 A1 | 3/2005 | Jones et al. | |
| 2009/0006554 A1 | 1/2009 | Fujishita | |
| 2010/0064172 A1* | 3/2010 | George et al. | 714/15 |
| 2010/0279670 A1* | 11/2010 | Ghai et al. | 455/414.3 |
| 2010/0287251 A1 | 11/2010 | Mahdi | |
| 2010/0312897 A1* | 12/2010 | Allen et al. | 709/227 |
| 2010/0325212 A1 | 12/2010 | Mahdi | |

FOREIGN PATENT DOCUMENTS

CN 101309237 A 11/2008

OTHER PUBLICATIONS

International Search Report, International Application No. PCT/CN2010/076433, Applicant: Huawei Technologies Co., Ltd. et al., mailing date: Dec. 9, 2010, 11 pages.

Mahy, R., et al., "The Session Initiation Protocol (SIP) "Replaces" Header," RFC 3891, Sep. 2004, 17 pages.

"3rd Generation Partnership Project; Technical Specification Group Core Network; IP Multimedia (IM) session handling; IM call model; Stage 2 (Release 8)," 3GPP TS 23.218, V8.2.0, Jun. 2008, 63 pages.

"3rd Generation Partnership Project; Technical Specification Group Services and System Aspects; Study on Architecture Impacts of Service Brokering (Release 8)," 3GPP TR 23.810, V8.0.0, Sep. 2008, 26 pages.

"3rd Generation Partnership Project; Technical Specification Group Core Network and Terminals; IP Multimedia call control protocol based on Session Initiation Protocol (SIP) and Session Description Protocol (SDP); Stage 3 (Release 8)," 3GPP TS 24.229, V8.6.0, Dec. 2008, 600 pages.

(Continued)

*Primary Examiner* — Alvin Zhu

(74) *Attorney, Agent, or Firm* — Slater & Matsil, L.L.P.

(57) ABSTRACT

A system and method for multimedia sharing in a collaborative session are provided. A method for operations at an applications server, where the applications server is a member of a session, includes receiving a first message to change a controller device from a first device to a second device, reconfiguring a signaling path of the session based on the first message, and communicating media with a remote party through the signaling path.

26 Claims, 28 Drawing Sheets

(56) References Cited

OTHER PUBLICATIONS

"3$^{rd}$ Generation Partnership Project; Technical Specification Group Core Network and Terminals; Common Basic Communication procedures using IP Multimedia (IM) Core Network (CN) subsystem; Protocol specification (Release 8)," 3GPP TS 24.628, V8.2.0, Dec. 2008, 48 pages.

"3$^{rd}$ Generation Partnership Project; Technical Specification Group Core Network and Terminals; Explicit Communication Transfer (ECT) using IP Multimedia (IM) Core Network (CN) subsystem; Protocol specification (Release 8)," 3GPP TS 24.629, V8.3.0, Jun. 2009, 28 pages.

* cited by examiner

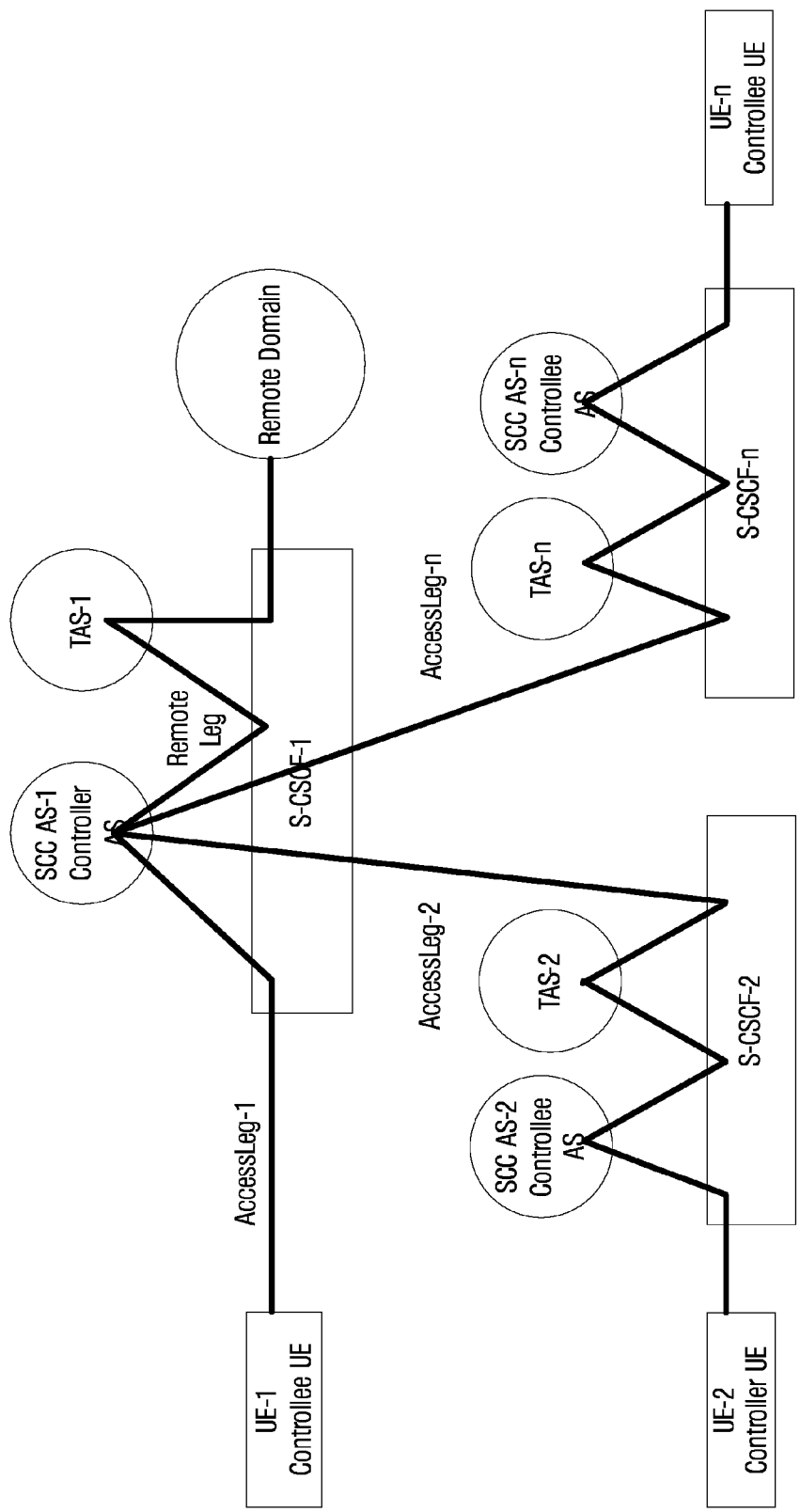

SYSTEM AND METHOD FOR MULTIMEDIA SHARING IN A COLLABORATIVE SESSION

This application claims the benefit of U.S. Provisional Application No. 61/237,955, filed on Aug. 28, 2009, entitled "Multimedia Telephony Service ("MMTel") Handling for Multimedia Sharing," which application is hereby incorporated herein by reference.

TECHNICAL FIELD

The present invention relates generally to a system and method for digital communications, and more particularly to a system and method for multimedia sharing in a collaborative session.

BACKGROUND

As mobile devices improve and include more enhanced capabilities, mobile devices have evolved to act as Internet Protocol (IP) devices. In one such system, e.g., a system employing IP Multimedia services (IMS) sessions uses a traditional signaling or bearer architecture for a local media session. The traditional IMS session is created between a User Equipment (UE) and a remote end, thereby enabling the UE to access media flows. The session control signaling flow, extends between a Call Session Control Function (CSCF), a Service Centralization Continuity Application Server (SCC AS), and a Telephony Application Server (TAS) (and/or other application servers).

SUMMARY OF THE INVENTION

These and other problems are generally solved or circumvented, and technical advantages are generally achieved, by preferred embodiments of the present invention which provide a system and method for multimedia sharing in a collaborative session.

In accordance with a preferred embodiment of the present invention, a method for operations at an applications server, where the applications server is a member of a session, is provided. The method includes receiving a first message to change a controller device from a first device to a second device, reconfiguring a signaling path of the session based on the first message, and communicating media with a remote party through the signaling path.

In accordance with another preferred embodiment of the present invention, a method for operations at an application server, where the application server is a member of a session, is provided. The method includes receiving a request to execute an operation, forwarding the request to a subset of local members of the session, forwarding the request to remote members of the session, and performing the request. The subset of local members includes local members that are not an originator of the request.

In accordance with another preferred embodiment of the present invention, a method for operations at an applications server, where the applications server is a member of a session, is provided. The method includes receiving a request for an execution of a telephony function, forwarding the request to a local member of the session, forwarding the request to a remote member of the session in response to receiving a first confirmation from the local member, and executing the request in response to receiving a second confirmation from the remote member. The request is not executed if the second confirmation is not received.

An advantage of an embodiment is that a single controller user may control services for a collaborative session. The controller user owns a profile of the service, which may be applied to other parts of the collaborative session, thereby allowing for a consistent definition and control of the collaborative session.

A further advantage of an embodiment is that capable members of the collaborative session may become the controller user of the collaborative session. Techniques for becoming controller user are provided.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 16a is a diagram of a MMTel structure after transferring collaborative session control from UE-1 to UE-2;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a multimedia session with remotely distributed users using a 3GPP IMS compliant communications system. The invention may also be applied, however, to multimedia sessions with remotely distributed users using other communications systems with support for collaborative operation.

Figure 1:
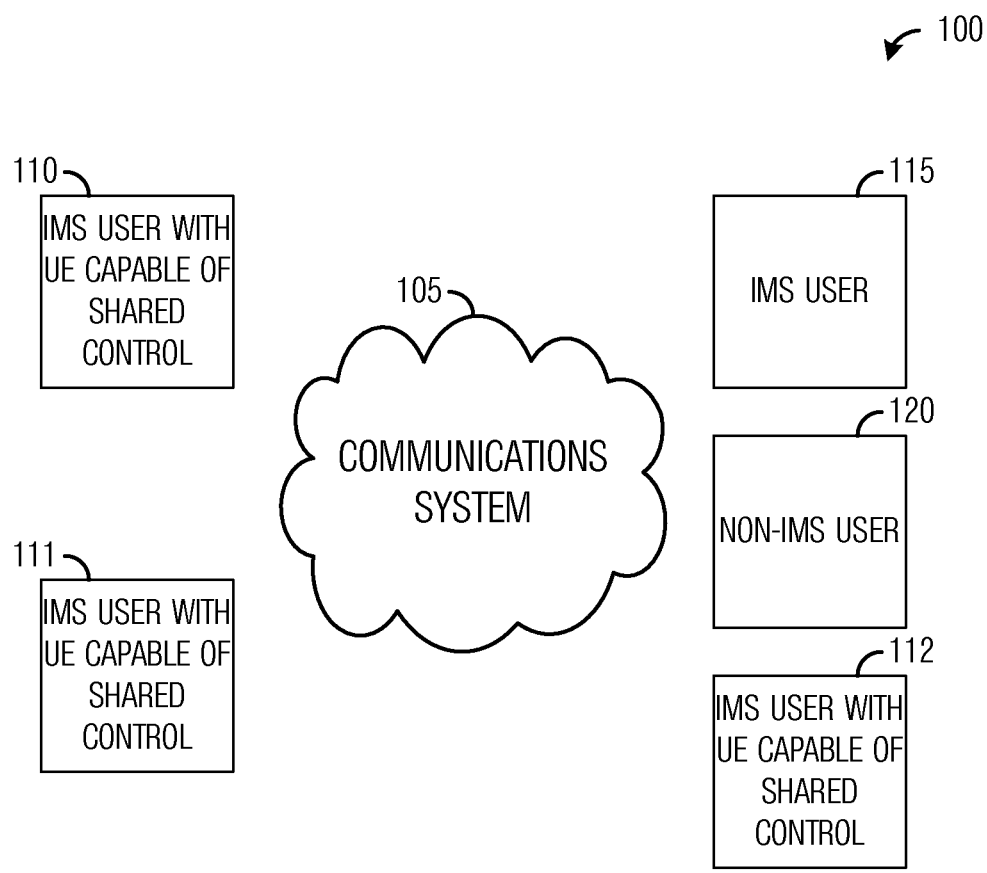
FIG. 1 is a diagram of a high-level view of a collaborative session with remotely distributed users.

FIG. 1 illustrates a high-level view of a collaborative session 100 with remotely distributed users. Collaborative session 100 includes a number of users communicating together over a communications system 105. Communications system 105 may be made up of a single communications system or multiple communications systems. For example, a 3GPP IMS compliant communications system may provide connectivity for control, media, and data for users with compatible communications devices, while for users with legacy equipment, a public switched telephone network (PSTN) may be available, while for users that are relatively close together, WiFi or other short-range wireless communications systems may be used to provided connectivity.

The users of collaborative session 100 may have different characteristics and capabilities. Some of the users, e.g., users 110 through 112, may have IMS compliant communications devices that are capable of shared control, while some of the users, e.g., user 115, may have IMS compliant communications devices that are not capable of shared control, while some of the users, e.g., user 120, may not have IMS compliant communications devices at all.

Users 110 through 112 may participate in sharing of control, data, and media in collaborative session 100, while user 115 may participate in sharing of data and media and may assume control of collaborative session 100. User 120 may participate in sharing of data and media but may not assume control of collaborative session 100.

A collaborative services community (CSC) may be formed dynamically by a collection of collaborative service users engaged in a collaborative service comprising a collaborative session or a set of collaborative sessions linked to each other. A master service centralization and continuity (SCC) application server (AS) is assigned to a CSC upon setup of a new collaborative session or upon merger of two or more standard IMS sessions to form a collaborative session, or merger of two or collaborative sessions. Other SCC AS involved in a collaborative session acts in a slave mode, simply relaying service controls to the master SCC AS.

Figure 2:
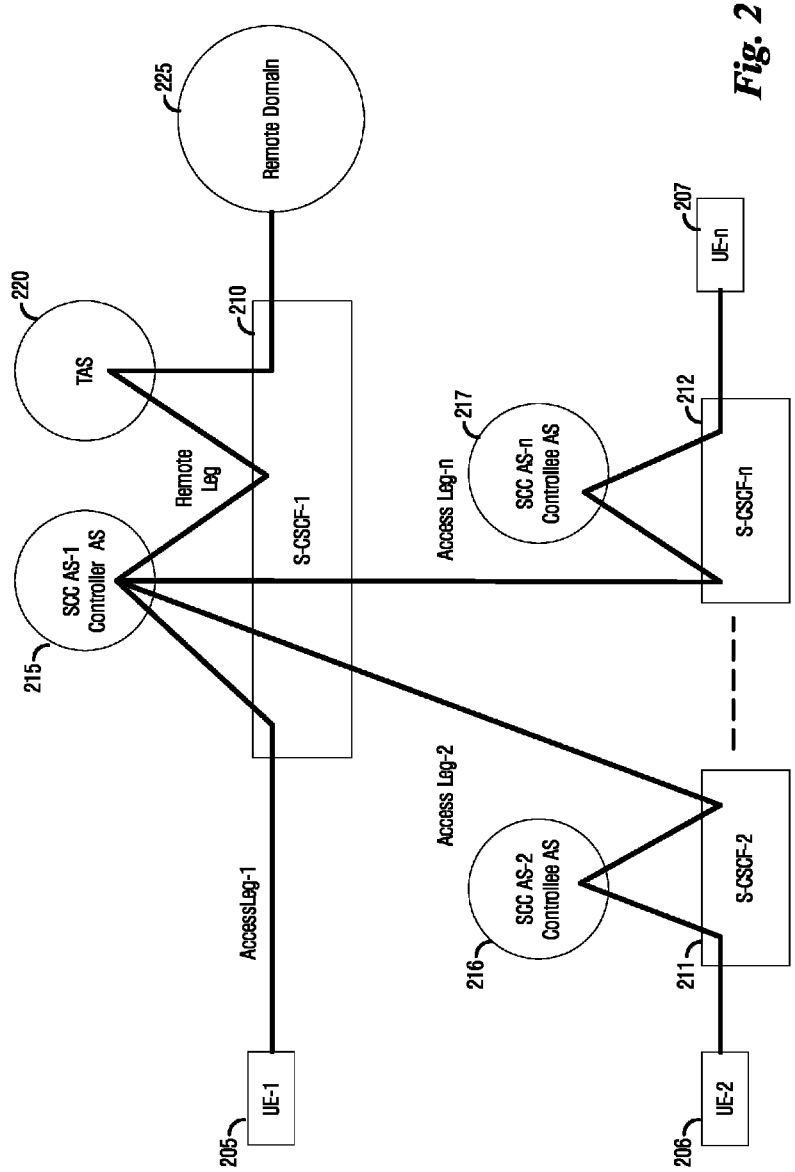
FIG. 2 is a diagram of a high-level view of a multimedia telephony (MMTel) structure for a collaborative session.

FIG. 2 illustrates a high-level view of a multimedia telephony (MMTel) structure 200 for a collaborative session. As shown in FIG. 2, MMTel structure 200 is for a collaborative session includes n UEs, for example, UE-1 205, UE-2 206, and UE-n 207, with UE-1 205 operating as a controller user. UE-1 205 may access services through a serving call session control function (S-CSCF) "S-CSCF-1" 210, while the other UEs in the collaborative session access services through similar S-CSCFs, e.g., UE-2 206 may access services through S-CSCF-2 211 and UE-n 207 may access services through S-CSCF-n 212. Connections between UEs and S-CSCF-1 210 may be referred to as access legs.

An SCC AS of UE-1 (shown as SCC AS-1 215) may serve as a controller AS for the collaborative session, while SCC AS of the other UEs, such as SCC AS-2 216 of UE-2 206 and SCC AS-n 217 of UE-n 207, may serve as controllee ASs. A telephony AS (TAS) 220 connected to S-CSCF-1 210 may provide connectivity of the collaborative session to a remote domain 225.

A user of UE-1 205 may be a controller user, a collaborative service subscriber who owns the controller UE (e.g., UE-1 205), which is in control of the MMTel services for the collaborative session at a given time. As shown above, the collaborative session may involve multiple users with privilege to share control of media flows provided by UE(s) that they own or by other UE(s) involved in the collaborative session. However, there is only one controller user at any given time for the collaborative session. The controller user owns the service profile to be applied towards remote legs of the collaborative session. The controller user may own one or more UEs that are involved in the collaborative session, but only one UE may be designated the controller UE. The controller UE status may be transferred among multiple UEs owned by the controller user once the collaborative session has been established.

Controller user status may be transferred from a current controller user to another user participating in the collaborative session or to a new user that may be interested in joining the collaborative session, after the collaborative session has been established. A service profile of the controller user may be the only service profile that is applied at initial setup of a collaborative session, i.e., the communications system executes initial filter criteria (iFC) based on the service profile of the controller user for collaborative session setup. Thereby, full blown iFC execution will not take place for the setup of access legs with other UEs (users), i.e., all MMTel services in the profiles of slave users of the collaborative session that may normally be applied at session setup are suppressed in a slave network (for example, by detecting a special collaborative service public service identity (PSI) in a refer request for a slave UE and/or a join request from the slave UE)).

A controller AS, such as SCC AS-1 215 (or the SCC AS of the controller user at collaborative session initiation), of the collaborative session may be established at the time of collaborative session setup. The SCC AS remains the controller AS for the life of the collaborative session, i.e., a remote leg of the collaborative session remains anchored at the same controller AS for the life of the collaborative session. Furthermore, all MMTel services may be executed and controlled by the controller user, the controller AS, and application servers configured in the controller user's profile for the life of the collaborative session.

A controlee UE owned by the controller user may request to be added to the collaborative session, and/or request to transfer control of the collaborative session to itself at anytime. The controller AS may not change due to the transfer of control to a new controller UE, i.e., the remote leg must remain anchored to the same SCC AS and the same set of iFCs may be executed after the transfer of control. A controlee UE not owned by the controller user may request to be added to the collaborative session, and/or request to transfer control of the collaborative session to itself at anytime after the collaborative session has been established and when no MMTel services are active under the current controller user. The controller AS may not change due to a transfer of control to the new controller UE, i.e., the remote leg must remain anchored to the same SCC AS. Generally, a transfer of service control may only be possible after the collaborative session has been established and when no MMTel services are active on the current controller UE to avoid conflicts in service execution resulting from differences in service profiles of different users involved in the collaborative session. Additionally, for initial offerings, only one controller user may be allowed for the collaborative session, i.e., transfer of service control may not be supported, due to technical complexity.

A controlee UE may be able to perform media control of media flow(s) that it owns, e.g., access transfer of the media flow, and/or hold/resume the media flows and/or invoke trick-mode commands through a media server or change the resolution of the media flows or invoke other media related operations. All MMTel services other than hold/resume may be blocked for the controlee UE. All media control service commands (e.g., hold/resume) may be arbitrated at the controller AS. Trick-mode commands (e.g., play, rewind, and so on) may be sent directly to the media server(s) where they are arbitrated at a centralized media server.

Figure 3A:
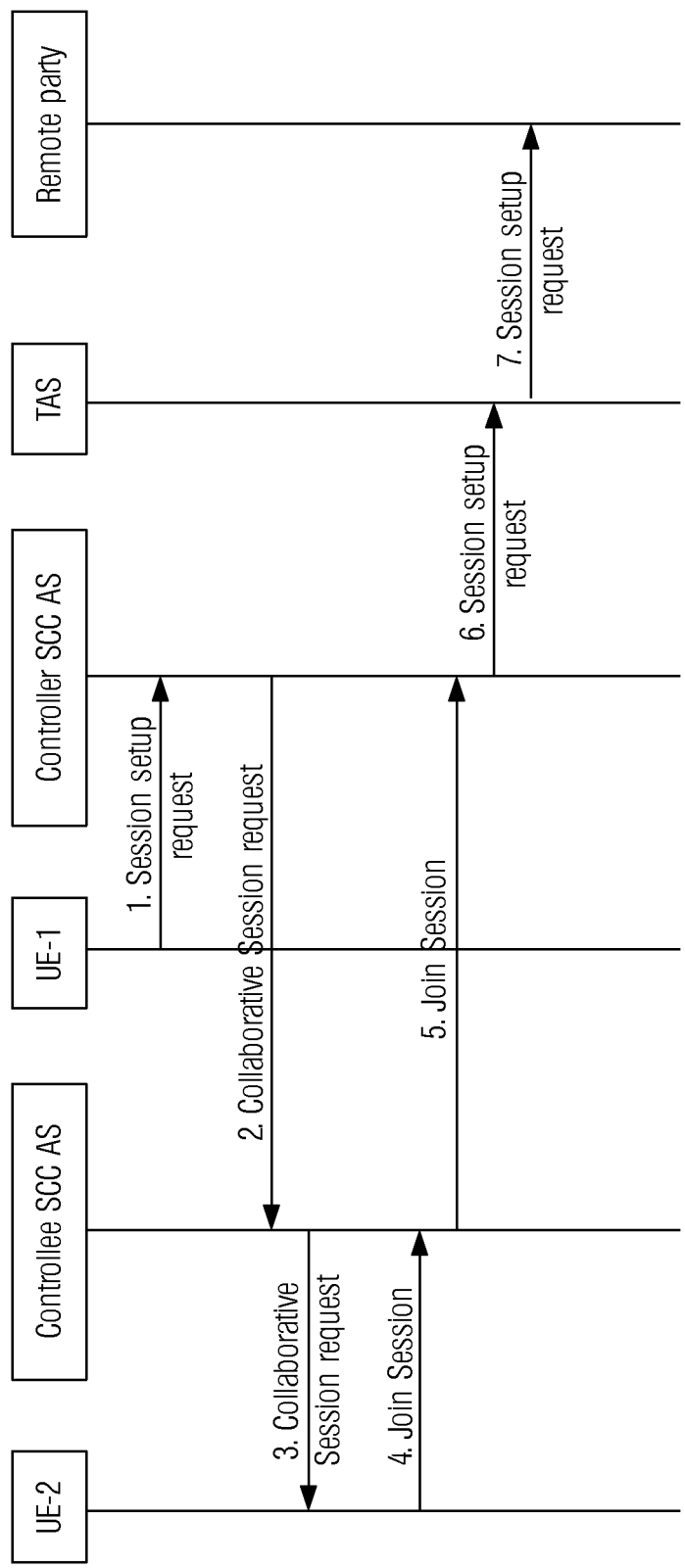
FIG. 3a is a diagram of a call flow with MMTel triggering at collaborative session origination without a TAS in the access leg of a controlee UE.

FIG. 3a illustrates a call flow with MMTel triggering at collaborative session origination without a TAS in the access leg of a controlee UE. TAS triggering may be the same as normal collaborative session origination, i.e., based on the service profile of UE-1 (the controller user). At UE-2, the iFC of UE-2 may prohibit TAS triggering for collaborative session request and for join session request. The PSI of a join session request may be used to configure iFC as required in controlee MMtel behavior.

As shown in FIG. 3a, a collaborative session between UE-1 and UE-2 may be formed. Furthermore, the collaborative session may involve a remote party. The collaborative session may originate with UE-1 and UE-2. In event #1, UE-1 may send a session setup request to its SCC AS, which will become a controller AS since UE-1 is originating the collaborative session and is therefore, the controller UE. The controller AS may send a collaborative session request to a SCC AS of UE-2 (shown as event #2). The SCC AS of UE-2, which may become a controlee AS, may forward the collaborative session request to UE-2 (shown as event #3).

For discussion purposes, let UE-2 wish to join the collaborative session and respond to the collaborative session request with a join session (shown as event #4) to the controlee AS. The controlee AS may respond to the collaborative session request from the controller AS with a join session (shown as event #5). The controller AS may further establish the collaborative session by sending a session setup request to a TAS of the remote party (shown as event #6), which in turn, may send a session setup request to the remote party (shown as event #7).

Figure 3B:
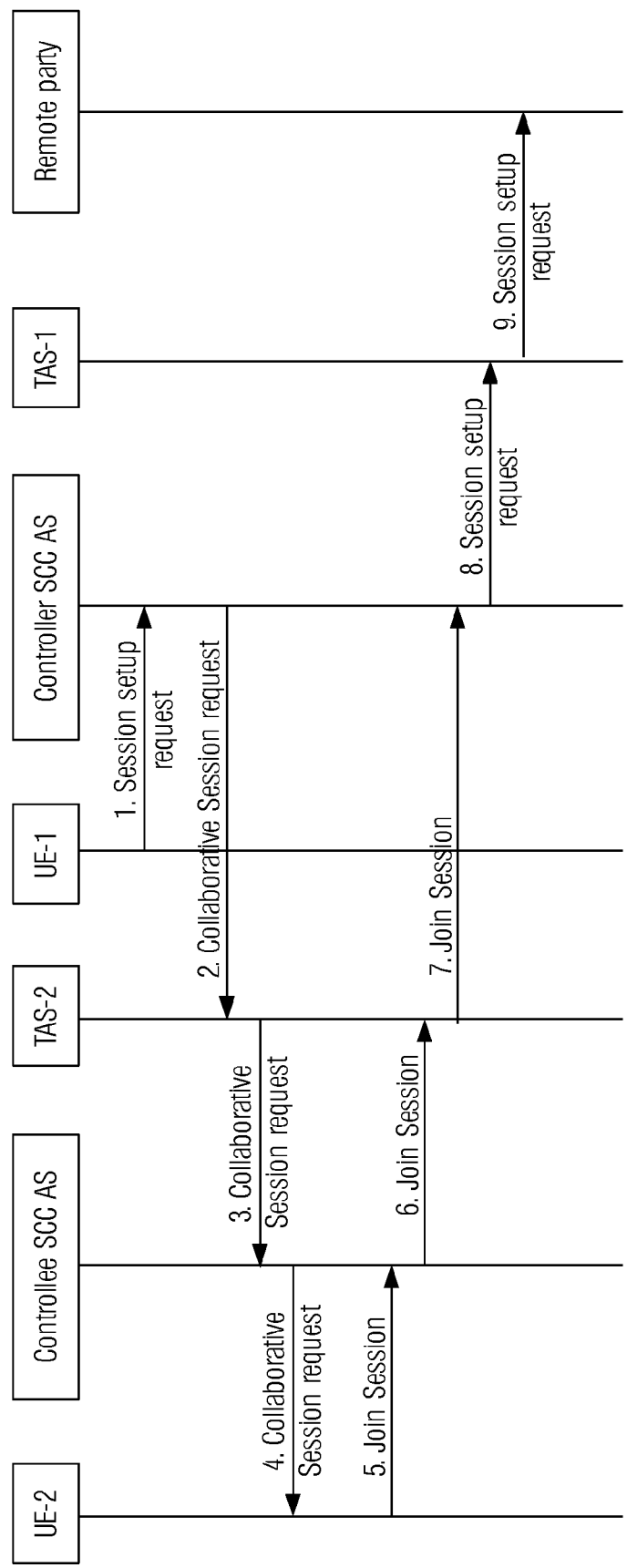
FIG. 3b is a diagram of a call flow with MMTel triggering at collaborative session origination with a TAS in the access leg of a controlee UE.

FIG. 3b illustrates a call flow with MMTel triggering at collaborative session origination with a TAS in the access leg of a controlee UE. TAS triggering may be the same as normal collaborative session origination, i.e., based on the service profile of UE-1 (the controller user). As shown in FIG. 3b, the collaborative session origination with a TAS in the access leg of the controlee UE may be similar to the collaborative session origination without a TAS in the access leg of the controlee UE (FIG. 3a) with an exception that the collaborative session request first being sent to the TAS and a corresponding response to the collaborative session request coming from the TAS.

Figure 4A:
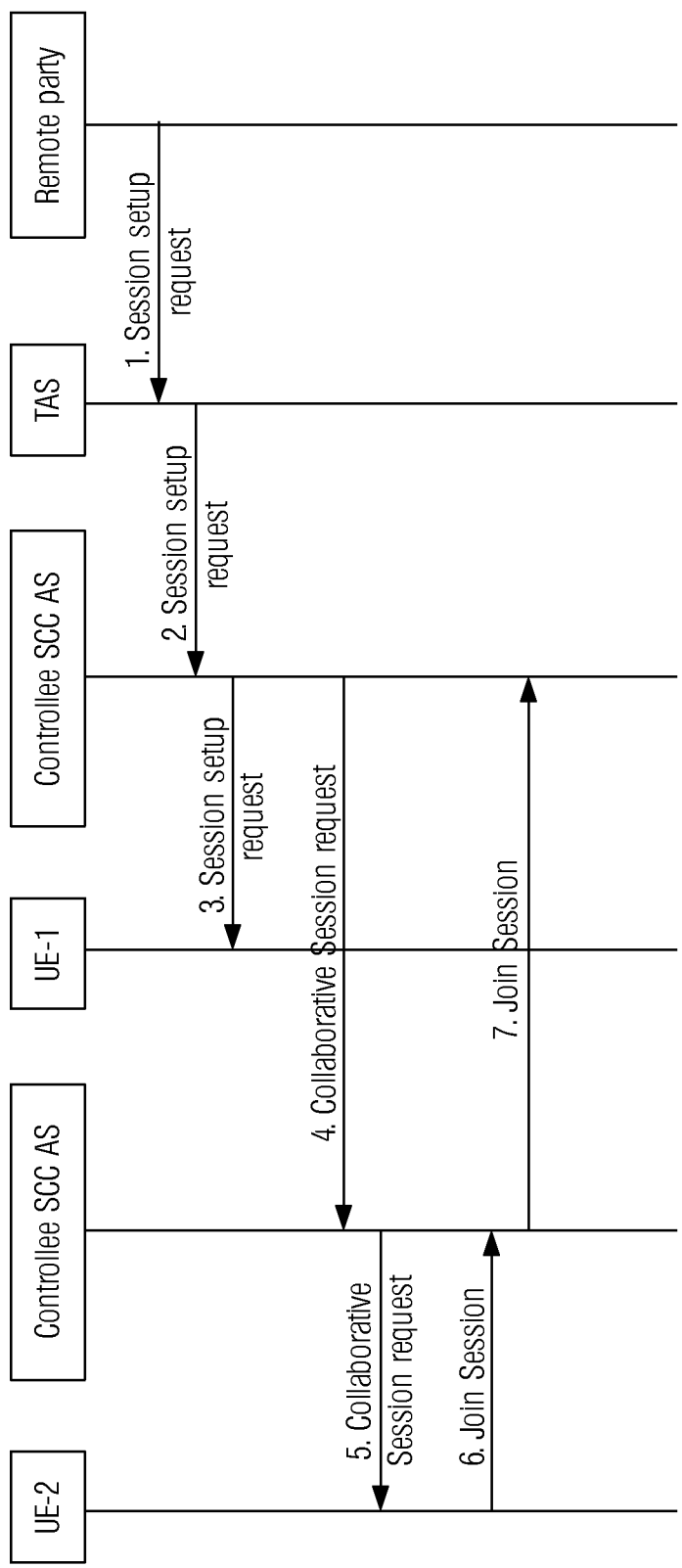
FIG. 4a is a diagram of a call flow with MMTel triggering at collaborative session termination without a TAS in the access leg of a controlee UE.

FIG. 4a illustrates a call flow with MMTel triggering at collaborative session termination without a TAS in the access leg of a controlee UE. TAS triggering may be the same as normal collaborative session termination, i.e., based on the service profile of UE-1 (the controller user). At UE-2, the iFC of UE-2 may prohibit TAS triggering for collaborative session request and for joint session request. The PSI of a join session request may be used to configure iFC as required in controlee MMtel behavior.

As shown in FIG. 4a, a collaborative session involving UE-1 and UE-2 may be formed. The collaborative session may also involve a remote party. Furthermore, the collaborative session may terminate with UE-1 and UE-2. Since the collaborative session terminates with UE-1 and UE-2, neither will be controller UEs. The remote party may send a session setup request to UE-1 and UE-2 through a TAS (shown as event #1). The TAS may attempt to have UE-1 join the collaborative session first by sending a session setup request to SCC AS of UE-1, which may operate as a controlee AS (shown as event #2). The SCC AS of UE-1 may forward the session setup request to UE-1 (shown as event #3).

The SCC AS of UE-1 may also forward a collaborative session request to SCC AS of UE-2, which may operate as another controlee AS (shown as event #4). The SCC AS of UE-2 may forward the collaborative session request to UE-2 (shown as event #5). For discussion purposes, let UE-2 wish to join the collaborative session and respond to the collaborative session request with a join session sent to the SCC AS of UE-2 (shown as event #6). The SCC AS of UE-2 may then forward the join session in response to the collaborative session request from the SCC AS of UE-1 (shown as event #7). Although not shown in FIG. 4a, the SCC AS of UE-1 may respond to the session setup request from the TAS and the collaborative session may be completed.

Figure 4B:
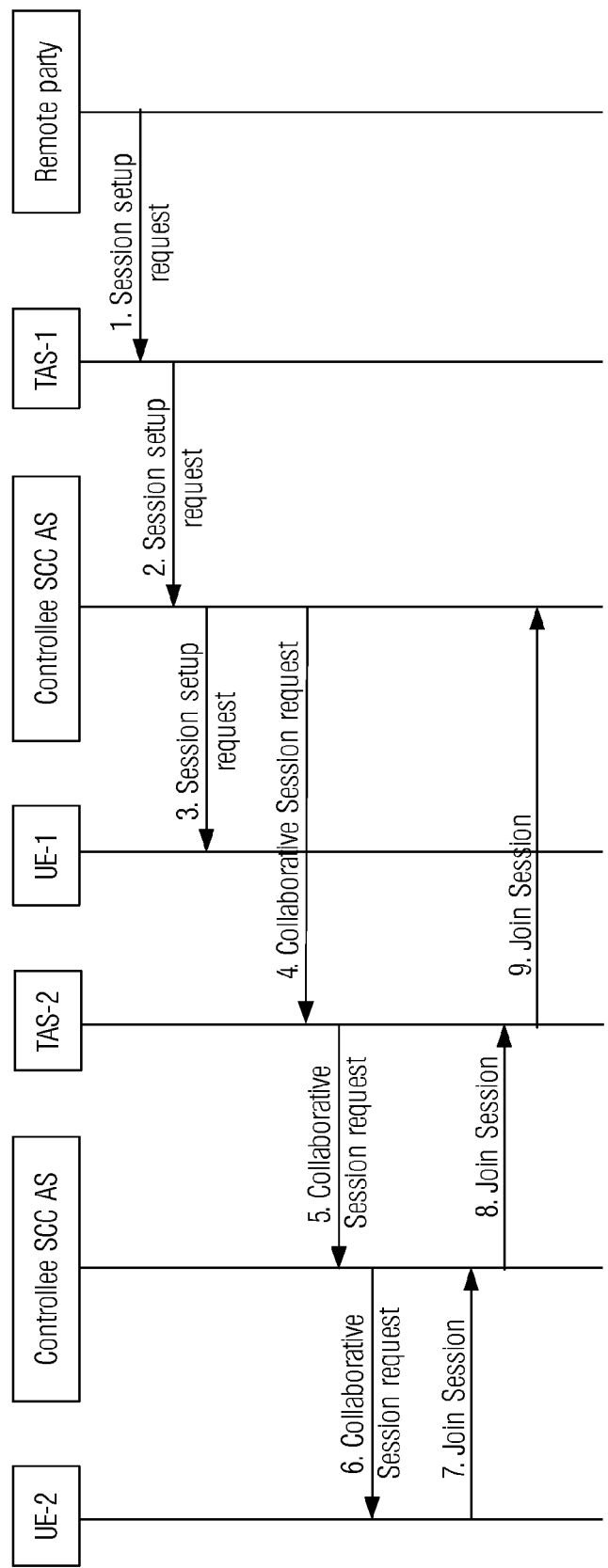
FIG. 4b is a diagram of a call flow with MMTel triggering at collaborative session termination with a TAS in the access leg of a controlee UE.

FIG. 4b illustrates a call flow with MMTel triggering at collaborative session termination with a TAS in the access leg of a controlee UE. TAS triggering may be the same as normal collaborative session origination, i.e., based on the service profile of UE-1 (the controller user). As shown in FIG. 4b, the collaborative session termination with a TAS in the access leg of the controlee UE may be similar to the collaborative session termination without a TAS in the access leg of the controlee UE (FIG. 4a) with an exception that the collaborative session request first being sent to the TAS and a corresponding response to the collaborative session request coming from the TAS.

Figure 5A:
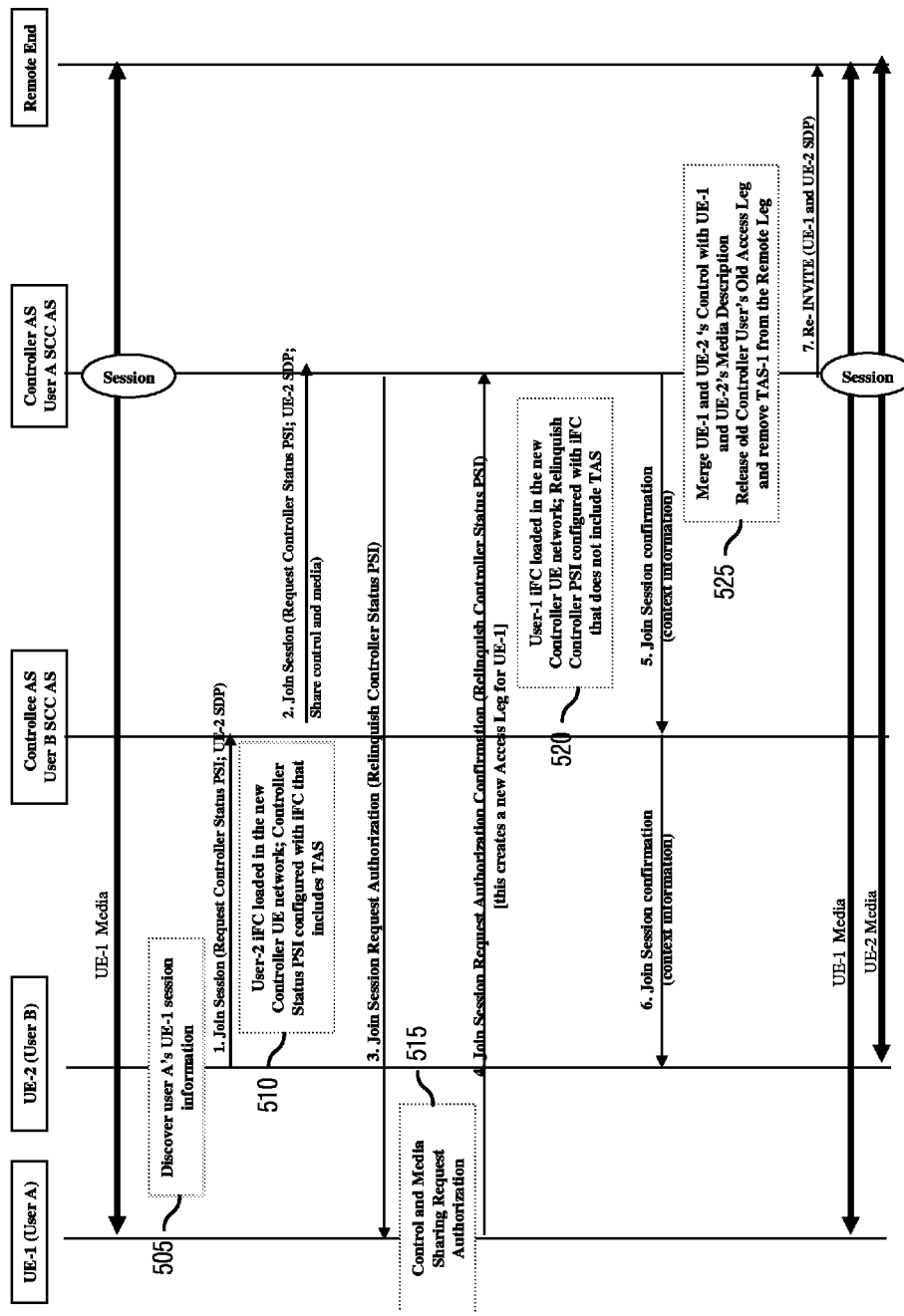
FIG. 5a is a diagram of a call flow of a UE (UE-2) adding itself to an ongoing collaborative session and requesting controller UE status.

FIG. 5a illustrates a call flow of a UE (UE-2) adding itself to an ongoing collaborative session and requesting controller UE status. As shown in FIG. 5, UE-2 may be adding itself to an ongoing collaborative session involving UE-1 and a remote end (a remote party). UE-2 may also request controller UE status. The call flow may begin with UE-2 discovering UE-1's session information (block 505). UE-2 may then send a join session request to its SCC AS (which may operate as a controlee AS). According to an embodiment, the join session request may include a request controller status PSI and a UE-2 session description protocol (SDP)). As a result, UE-2's iFC may be loaded in a new controller UE network and the controller status PSI may be configured with iFC that includes TAS (block 510).

The SCC AS of UE-2 may send the join session request to a SCC AS of UE-1 (shown as event #2). The join session request may include the request controller status PSI, the UE-2 SDP, and a share control and media indicator. The SCC AS of UE-1 may send a join session request authorization to UE-1 (shown as event #3). The join session request authorization may include a relinquish controller status PSI). UE-1 may perform a control and media sharing request authorization (block 515).

For discussion purposes, let UE-1 agree to allow UE-2 to join the collaborative session and to relinquish controller UE status. UE-1 may respond to the join session request authorization with a join session request authorization confirmation to the SCC AS of UE-1 (shown as event #4). The join session request authorization confirmation may include a relinquish controller status PSI, which may result in a creation of a new access leg for UE-1. The iFC for UE-1 may be loaded in the new controller UE network and the relinquish controller PSI may be configured with an iFC that does not include TAS (block 520).

The SCC AS of UE-1 may then send a join session confirmation that contains context information about the collaborative session to the SCC AS of UE-2 (shown as event #5), which may in turn, send the join session confirmation to UE-2 (shown as event #6). The SCC AS of UE-1 may merge UE-1 and UE-2's control with UE-1 and UE-2's media description. Furthermore, the SCC AS of UE-1 may release old controller user's old access leg and remove TAS for UE-1 from the remote leg. The SCC AS of UE-1 may also re-invite the remote end (the remote party) with a re-invite message (shown as event #7). The re-invite message may contain both UE-1 and UE-2 SDP. The collaborative session may then be complete with UE-1 and UE-2 and the remote end, with UE-2 being the controller UE.

TAS may be added to UE-2 side upon processing of join session request from UE-2, while TAS may be removed from UE-1 side upon setup of new access leg to change UE-1's status from controller UE to controlee UE. The old access leg of UE-1 (when UE-1 was controller UE) may be released upon successful completion of the setup of the new access leg.

Figure 5B:
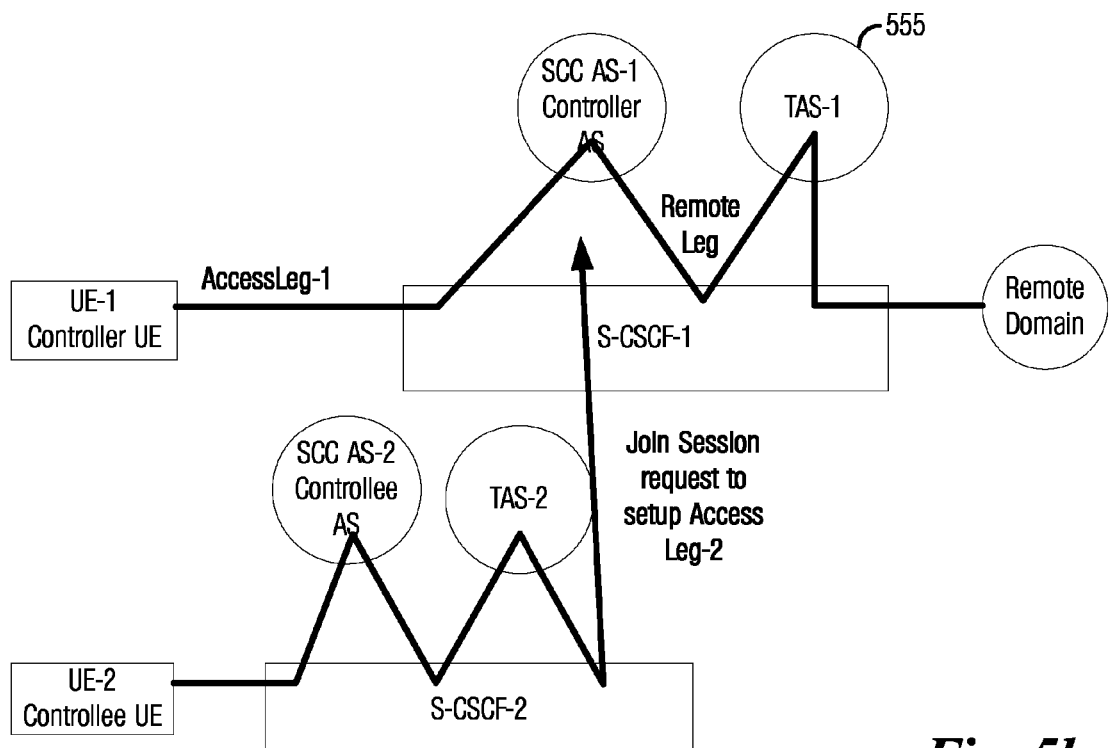
FIG. 5b is a diagram of a MMTel structure for a collaborative session between UE-1 and a remote end prior to UE-2 joining the collaborative session and becoming controller UE.

FIG. 5b illustrates a MMTel structure for a collaborative session between UE-1 and a remote end prior to UE-2 joining the collaborative session and becoming controller UE. Prior to UE-2 joining the collaborative session, UE-1 is the controlling UE and a TAS 555 for UE-1 is the server for the collaborative session.

Figure 5C:
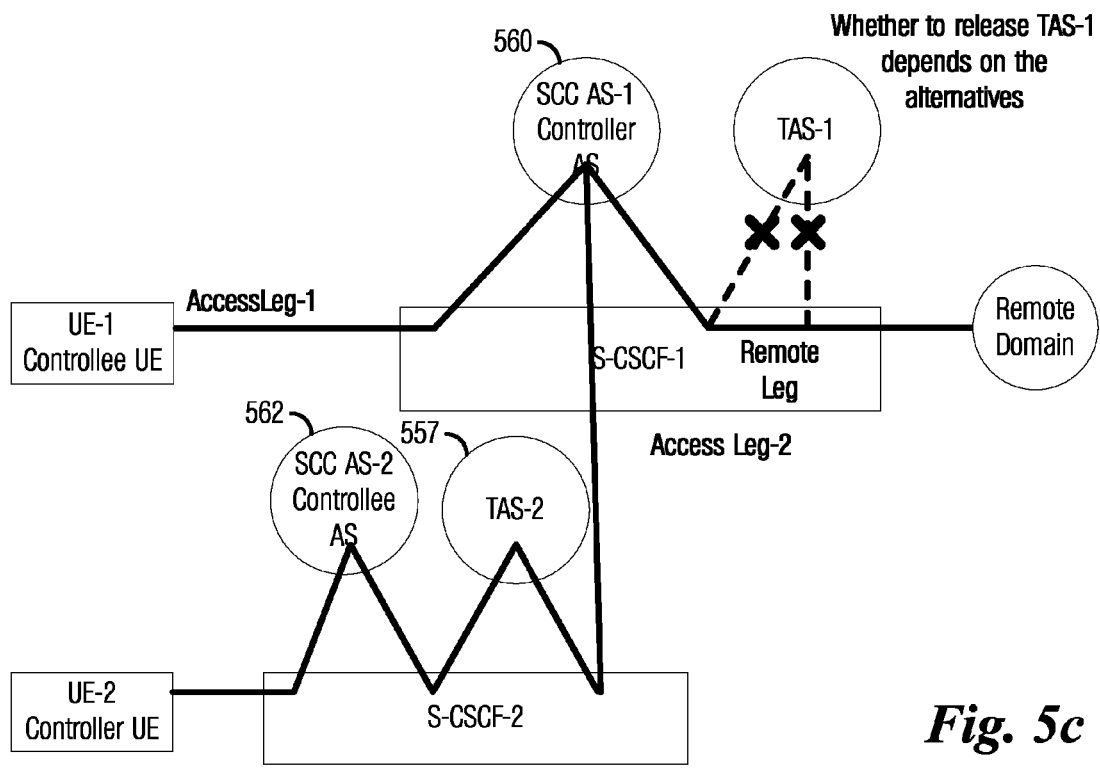
FIG. 5c is a diagram of a MMTel structure for the collaborative session between UE-1 and UE-2 and a remote end after UE-2 joins the collaborative session and becomes the controller UE.

FIG. 5c illustrates a MMTel structure for the collaborative session between UE-1 and UE-2 and a remote end after UE-2 joins the collaborative session and becomes the controller UE. After UE-2 becomes the controller UE, a TAS 557 becomes the server for the collaborative session. However, whether or not TAS 555 is released depends upon how a number of considerations. As discussed previously, SCC AS 560 of UE-1 remains the controller AS although UE-2 has its own SCC AS 562.

Several alternatives exist for switching the controller UE from UE-1 to UE-2.

Figure 6:
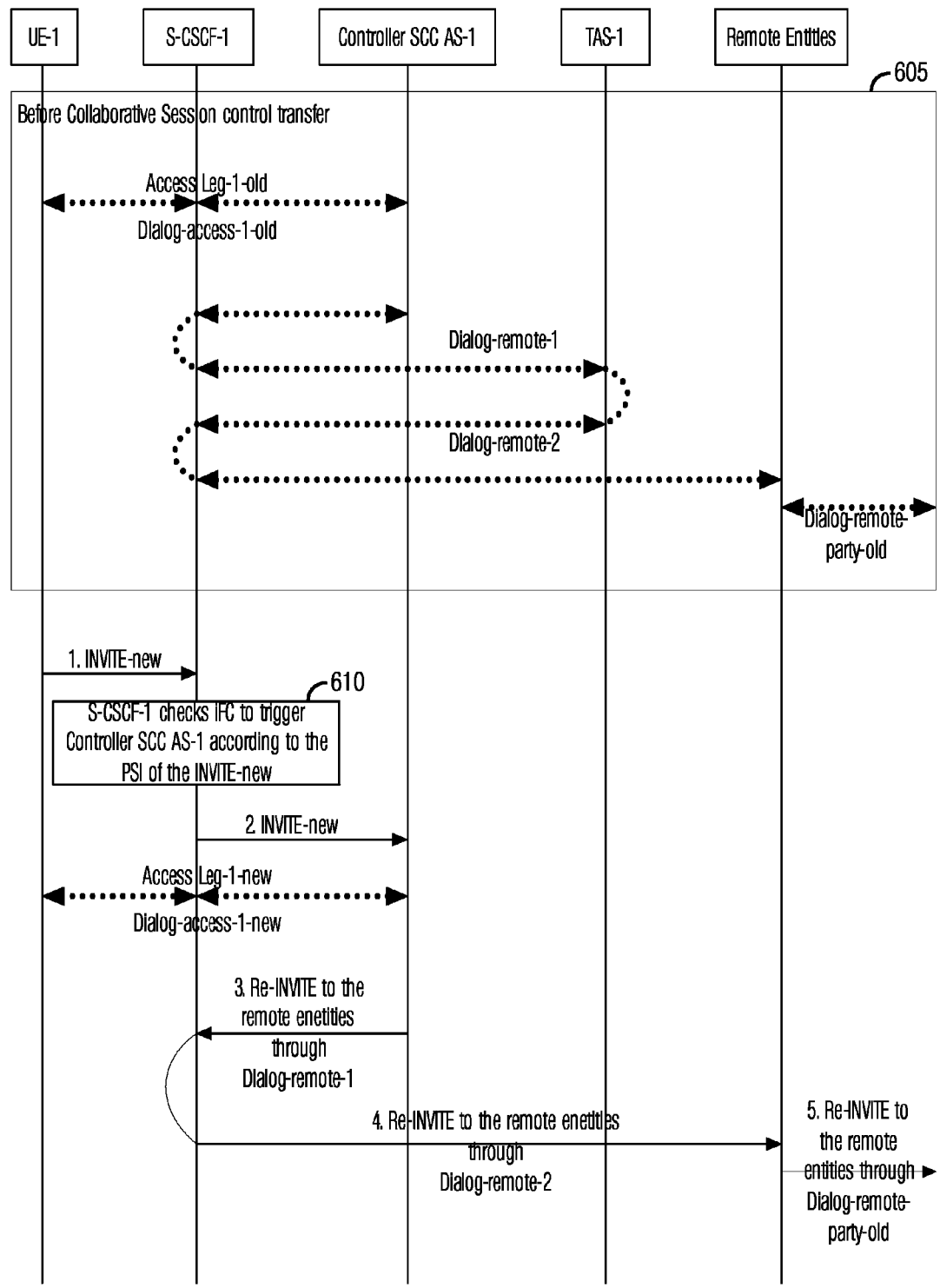
FIG. 6 is a diagram of a call flow of releasing the TAS for UE-1 by S-CSCF-1 with a re-invite message.

According to a first embodiment, TAS for UE-1 may be released by a S-CSCF of UE-1 (shown in FIG. 5b as S-CSCF-1) with a re-invite command. FIG. 6 illustrates a call flow of releasing the TAS for UE-1 by S-CSCF-1 with a re-invite message. Block 605 illustrates signaling paths between UE-1, S-CSCF-1, controller AS for UE-1 (controller SCC AS-1), TAS (TAS-1) for UE-1, and remote entities prior to controller UE transfer.

The controller UE transfer may begin with UE-1 sending an invite-new message to the S-CSCF-1 (shown as event #1). Generally, the invite-new message may be used to initiate a new binding for the collaborative session. After receiving the invite-new message from UE-1, the S-CSCF-1 may check its iFC to trigger the controller SCC AS-1 for UE-1 according to a PSI of the invite-new message (block 610). The S-CSCF-1 may forward the invite-new message to controller SCC AS-1 (shown as event #2). As a result, a new access leg "Access Leg-1-new" may be created along with a dialog access "Dialog-access-1-new".

Several alternatives may be possible for forwarding the invite-new message to controller SCC AS-1 (event #2). a) An S-CSCF for UE-1 (S-CSCF-1) may check the iFC to trigger SCC AS-1. Alternative a) may be dependent on whether or not S-CSCF-1 allows sending the invite-new message via an IMS service control (ISC) interface to controller SCC AS-1 without receiving an invite-new back from controller SCC AS-1. b) Set a request-URI of the invite-new message to the PSI of controller SCC AS-1 so that the S-CSCF-1 can route the invite-new message to controller SCC AS-1 according to normal SIP routing procedure.

Controller SCC AS-1 may then send to the S-CSCF-1 a re-invite message to re-invite remote entities through Dialog-remote-1 (shown as event #3). The S-CSCF-1 may send the re-invite message to the remote entities through Dialog-remote-2 (shown as event #4), which may send the re-invite message to the remote entities through Dialog-remote-party-old (shown as event #5). The re-invite message may result in an update of information related to the collaborative session, such as new bindings resulting from the controller UE change.

The sending of the re-invite message to the remote entities through Dialog-remote-2 may require a consideration of the following:

How does the S-CSCF-1 know that it should route the re-invite message from the controller SCC AS-1 to the remote entities instead of routing the re-invite message to TAS-1 via Dialog-remote-1 (the old path)? According to an embodiment, an indication may be included in the re-invite message to indicate to the S-CSCF-1 what it should do.

How does the S-CSCF-1 decide to which entity the re-invite message should be sent to? According to an embodiment, using the indication in the re-invite message, the S-CSCF-1 should be able to recognize that the TAS-1 shall be released, and should be able to find the entity (the entity may be another AS in S-CSCF-1's domain or CSCFs in the remote domain) in the signaling path after the TAS-1 and send the re-invite message to the entity.

How does the S-CSCF-1 release the TAS-1? According to an embodiment, the S-CSCF-1 may send the re-invite message to the remote entity instead of sending it to the TAS-1 according to the route of the original signaling path. However, there is no current procedure for a S-CSCF to release a specific TAS in the signaling path. Therefore, enhancements to S-CSCF-1 may be needed:

S-CSCF-1 may be able to recognize that it should release the TAS-1 from the signaling path;

S-CSCF-1 may be able to recognize the access leg in and the access leg out of the TAS-1; and S-CSCF-1 may be able to send a release session request to the access leg in of the TAS-1 and terminate the release session request from the access leg out of the TAS-1.

Figure 7A:
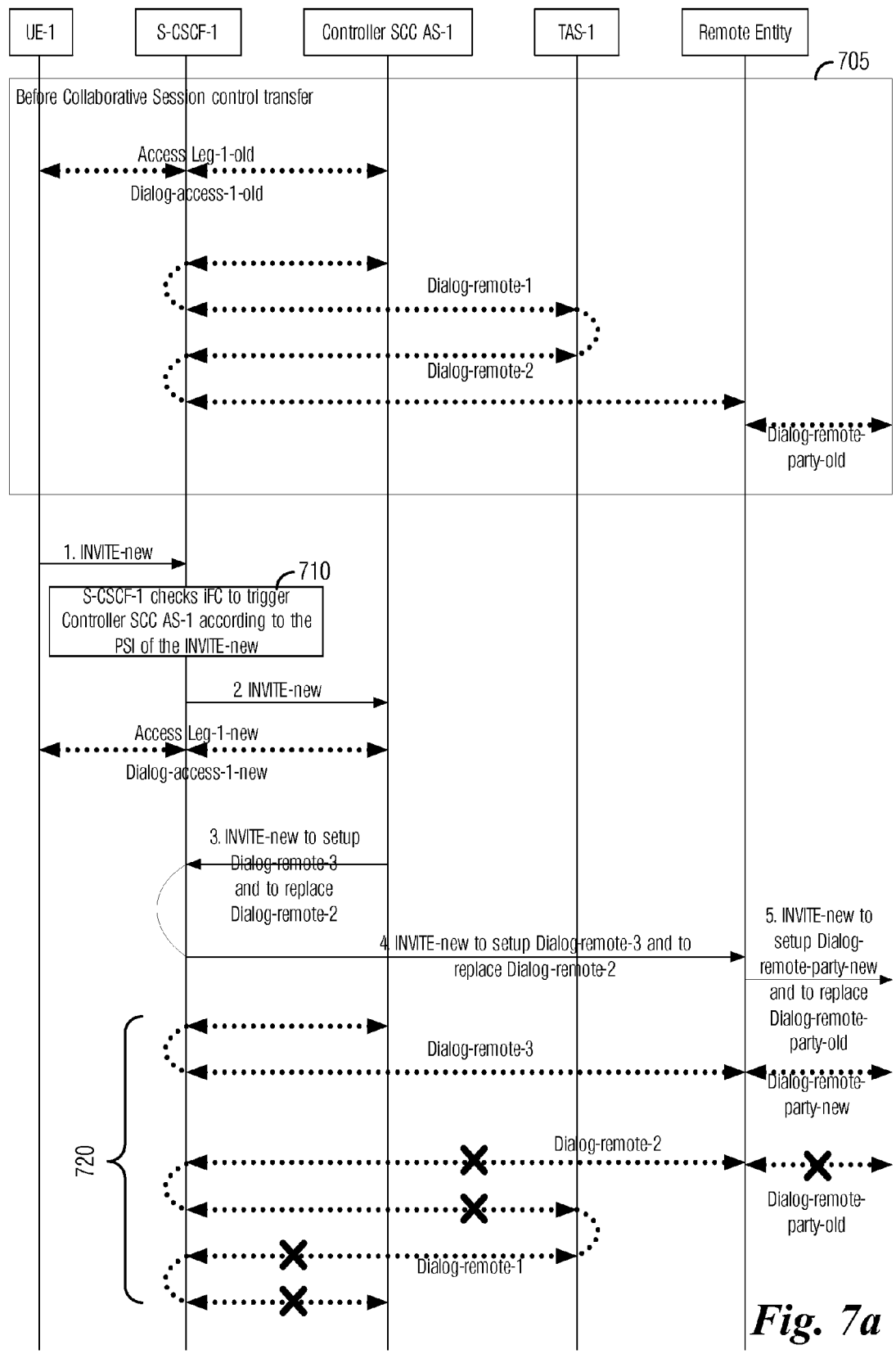
FIG. 7a is a diagram of a call flow for releasing the TAS (TAS-1) for UE-1 by S-CSCF-1 with an invite-new message with a replace header.

According to a second embodiment, TAS for UE-1 may be released by S-CSCF-1 with an invite-new message with replace header. FIG. 7a illustrates a call flow for releasing the TAS (TAS-1) for UE-1 by S-CSCF-1 with an invite-new message with a replace header. Block 705 illustrates signaling paths between UE-1, S-CSCF-1, controller AS for UE-1 (controller SCC AS-1), TAS-1, and remote entities prior to controller UE transfer.

The controller UE transfer may begin with UE-1 sending an invite-new message to S-CSCF-1 (shown as event #1). After receiving the invite-new message from UE-1, the S-CSCF-1 may check its iFC to trigger the SCC AS (controller SCC AS-1) for UE-1 according to a PSI of the invite-new message (block 710). The S-CSCF-1 may forward the invite-new message to the controller SCC AS-1 (shown as event #2). As a result, a new access leg "Access Leg-1-new" may be created along with a dialog access "Dialog-access-1-new".

Several alternatives may be possible for forwarding the invite-new message to controller SCC AS-1 (event #2). a) An S-CSCF for UE-1 (S-CSCF-1) may check the iFC to trigger SCC AS-1. Alternative a) may be dependent on whether or not S-CSCF-1 allows sending the invite-new message via an IMS service control (ISC) interface to controller SCC AS-1 without receiving an invite-new back from controller SCC AS-1. b) Set a request-URI of the invite-new message to the PSI of controller SCC AS-1 so that the S-CSCF-1 can route the invite-new message to controller SCC AS-1 according to normal SIP routing procedure.

The controller SCC AS-1 may send an invite-new message to S-CSCF-1 to setup a Dialog-remote-3 path and to replace Dialog-remote-2 path (shown as event #3). The S-CSCF-1 may send the invite-new message to the remote entity to setup Dialog-remote-3 and to replace Dialog-remote-2 (shown as event #4). The remote entity may use the invite-new message to setup Dialog-remote-party-new and to replace Dialog-remote-party-old (shown as event #5). Span 720 illustrates signaling paths after controller UE transfer.

The sending of the invite-new message may require a consideration of the following:

Dialog-remote-2 should be replaced.

TAS-1 may need to feedback information for Dialog-remote-2 to the controller SCC AS-1.

Alternatives for the TAS-1 to decide when to feedback the information for Dialog-remote-2 and when not to feedback information for Dialog-remote-2 include:

TAS-1 may be enhanced to feedback information for Dialog-remote-2 to the S-CSCF-1 automatically, and the S-CSCF-1 may forward the information for Dialog-remote-2 to the controller SCC AS-1;

TAS-1 may be enhanced to check whether there is a SCC AS in the signaling path. If there is a SCC AS in the signaling path, then TAS-1 may be enhanced to feedback information for Dialog-remote-2 to the S-CSCF-1 automatically, and the S-CSCF-1 may forward the information for Dialog-remote-2 to the controller SCC AS-1. Else, TAS-1 does not need to feedback information for Dialog-remote-2;

A technical solution for the above interaction is already specified elsewhere.

The sending of the invite-new message to the remote entities through Dialog-remote-2 may require a consideration of the following:

An indication, such as a special PSI, may be included in the invite-new message to indicate to the S-CSCF-1 not to trigger TAS-1.

The S-CSCF-1 should be able to decide which entity the invite-new message may be sent to. The S-CSCF may be enhanced so that enhancements for received invite-new messages with information for Dialog-remote-2 in the replace header should not be performed. Therefore, the S-CSCF-1 may not have the following functions:

recognize the information for Dialog-remote-2 in the replace header of the invite-new message;

find out the signaling path of Dialog-remote-2 between the S-CSCF-1 and the remote entity;

send the invite-new message to the remote entities via Dialog-remote-2.

Upon receiving the invite-new message from the S-CSCF-1, the remote entity releases Dialog-remote-2, the controller SCC AS-1 should be able to terminate the release session request via Dialog-remote-1.

Figure 7B:
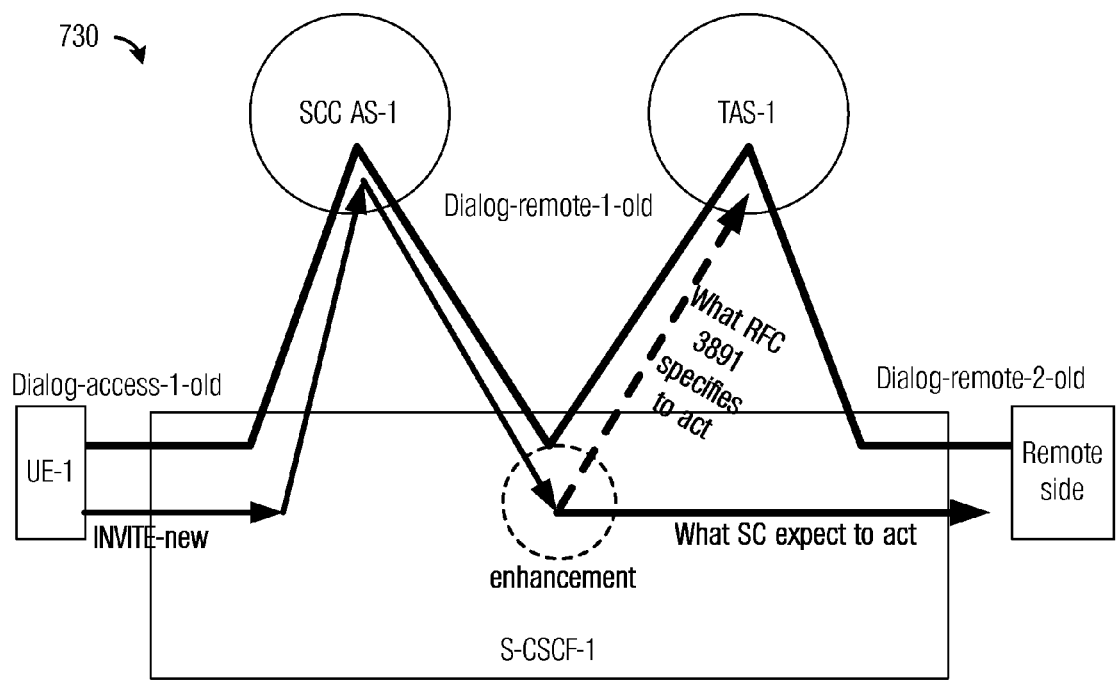
FIG. 7b is a diagram of a MMTel structure with signaling paths labeled.

FIG. 7b illustrates a MMTel structure 730 with signaling paths labeled.

Figure 7C:
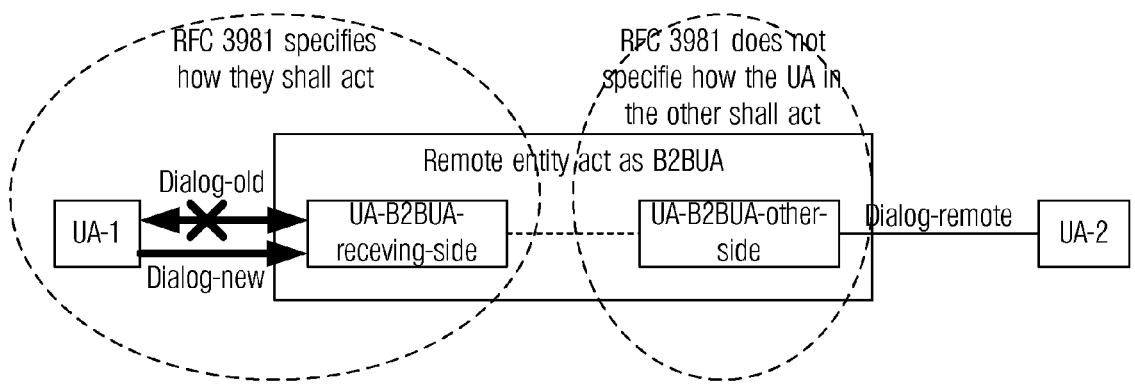
FIG. 7c is a diagram of operations of user agents of a B2BUA may react when receiving a replace header.

Since the remote entity may be a back to back user agent (B2BUA), there may be no specification regarding how the remote entity should react when it receives the invite-new with the replace header with the Dialog-remote-2 from the S-CSCF-1. The remote entity may or may not perform the operations described in event #5 (the remote entity uses the invite-new message to setup Dialog-remote-party-new and to replace Dialog-remote-party-old). FIG. 7c illustrates the operations of user agents of a B2BUA may react when receiving a replace header.

If the remote entity performs the operations described in event #5, due to the fact that Dialog-remote-party-old is released and replaced by Dialog-remote-party-new, users of the remote entity may receive the notification from the remote entity when a communication is taking place. Users of the remote entity may assume that the notification is a form of disturbance from the communications system. Since ECT uses the same procedure to send a new-invite message to the remote entity to replace the old dialog, the impact to the remote entity may be acceptable or the remote entity may be capable of handling the invite-new without disturbing the user.

If the remote entity does not perform the operations described in event #5, then there may be no impact to the remote entity or users of the remote entity. FIG. 7c illustrates a user agent's reaction to receiving a replace header.

According to a third embodiment, TAS (TAS-1) for UE-1 may release itself. According to an embodiment, TAS-1 may only release itself during session establishment.

Figure 8:
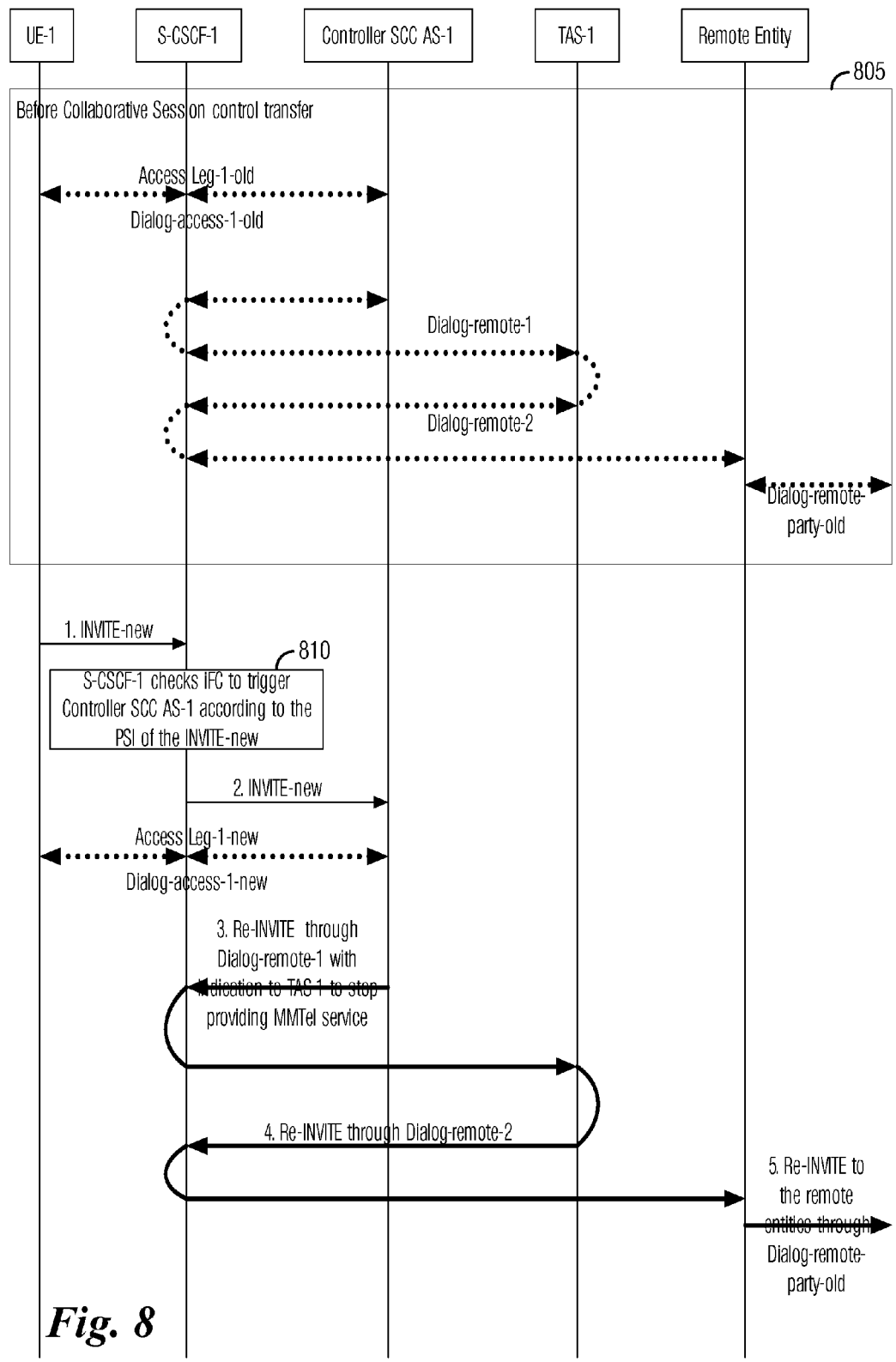
FIG. 8 is a diagram of a call flow for keeping the TAS-1 in the signaling path.

According to a fourth embodiment, TAS for UE-1 may be kept in the signaling path. FIG. 8 illustrates a call flow for keeping the TAS-1 in the signaling path. Block 805 illustrates signaling paths between UE-1, S-CSCF-1, controller AS (controller SCC AS-1) for UE-1, TAS (TAS-1) for UE-1, and remote entities prior to controller UE transfer.

The controller UE transfer may begin with UE-1 sending an invite-new message to the S-CSCF-1 (shown as event #1). After receiving the invite-new message from UE-1, the S-CSCF-1 may check its iFC to trigger the controller SCC AS-1 for UE-1 according to a PSI of the invite-new message (block 810). The S-CSCF-1 may forward the invite-new message to controller SCC AS-1 (shown as event #2). As a result, a new access leg "Access Leg-1-new" may be created along with a dialog access "Dialog-access-1-new". For events #1 and #2, UE-1 may not need to establish a new dialog to the controller SCC AS-1.

The controller SCC AS-1 may send to the S-CSCF-1 a re-invite message to re-invite remote entities through Dialog-remote-1 (shown as event #3). According to an embodiment, the re-invite message may include an indication to TAS-1 to stop providing MMTel services. The S-CSCF-1 may forward the re-invite message to TAS-1. TAS-1 may send the re-invite message, through Dialog-remote-2 to S-CSCF-1 and the remote entity (shown as event #4). The remote entities may send the re-invite to other remote entities through Dialog-remote-party-old (shown as event #5).

In event #3, since the re-invite may cause a session update on a remote leg, the controller SCC AS-1 may send an indication to TAS-1 in the re-invite message or via another SIP message to disable MMTel services for the collaborative session.

Figure 9A:
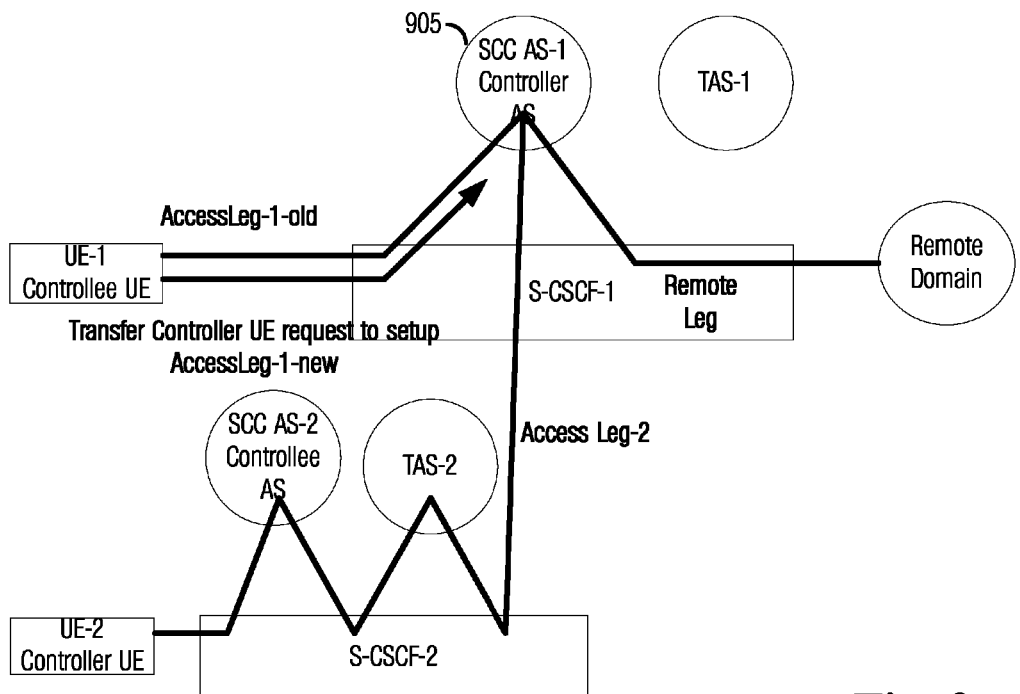
FIG. 9a is a diagram of a MMTel structure for a collaborative session between UE-1, UE-2, and a remote end prior to UE-1 becoming a controller UE after UE-1 initially being the controller UE and then UE-2 becoming the controller UE.

FIG. 9a illustrates a MMTel structure for a collaborative session between UE-1, UE-2, and a remote end prior to UE-1 becoming a controller UE after UE-1 initially being the controller UE and then UE-2 becoming the controller UE. Since UE-1 was initially the controller UE, controller SCC AS-1 905 remains the controller AS for the collaborative session, even while UE-2 is the controller UE. In order for UE-1 to become the controller UE of the collaborative session again, UE-1 may request a setup of AccessLeg-1-new.

Figure 9B:
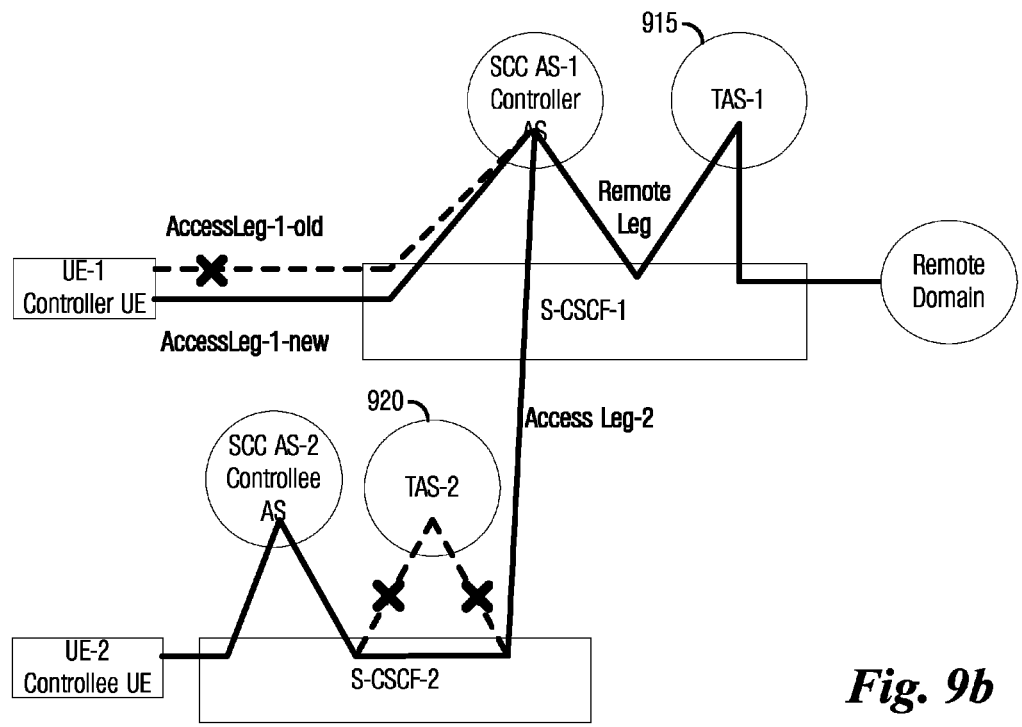
FIG. 9b is a diagram of a MMTel structure for a collaborative session between UE-1, UE-2, and a remote end after UE-1 becoming the controller UE after UE-1 initially being the controller UE and then UE-2 becoming the controller UE.

FIG. 9b illustrates a MMTel structure for a collaborative session between UE-1, UE-2, and a remote end after UE-1 becoming the controller UE after UE-1 initially being the controller UE and then UE-2 becoming the controller UE. As a result of UE-1 becoming the controller UE again, Access-Leg-1-old may be deleted and AccessLeg-1-new may be used by UE-1. Furthermore, TAS-1 915 may once again be part of the signaling path and TAS-2 920 may be deleted from the signaling path.

Figure 10:
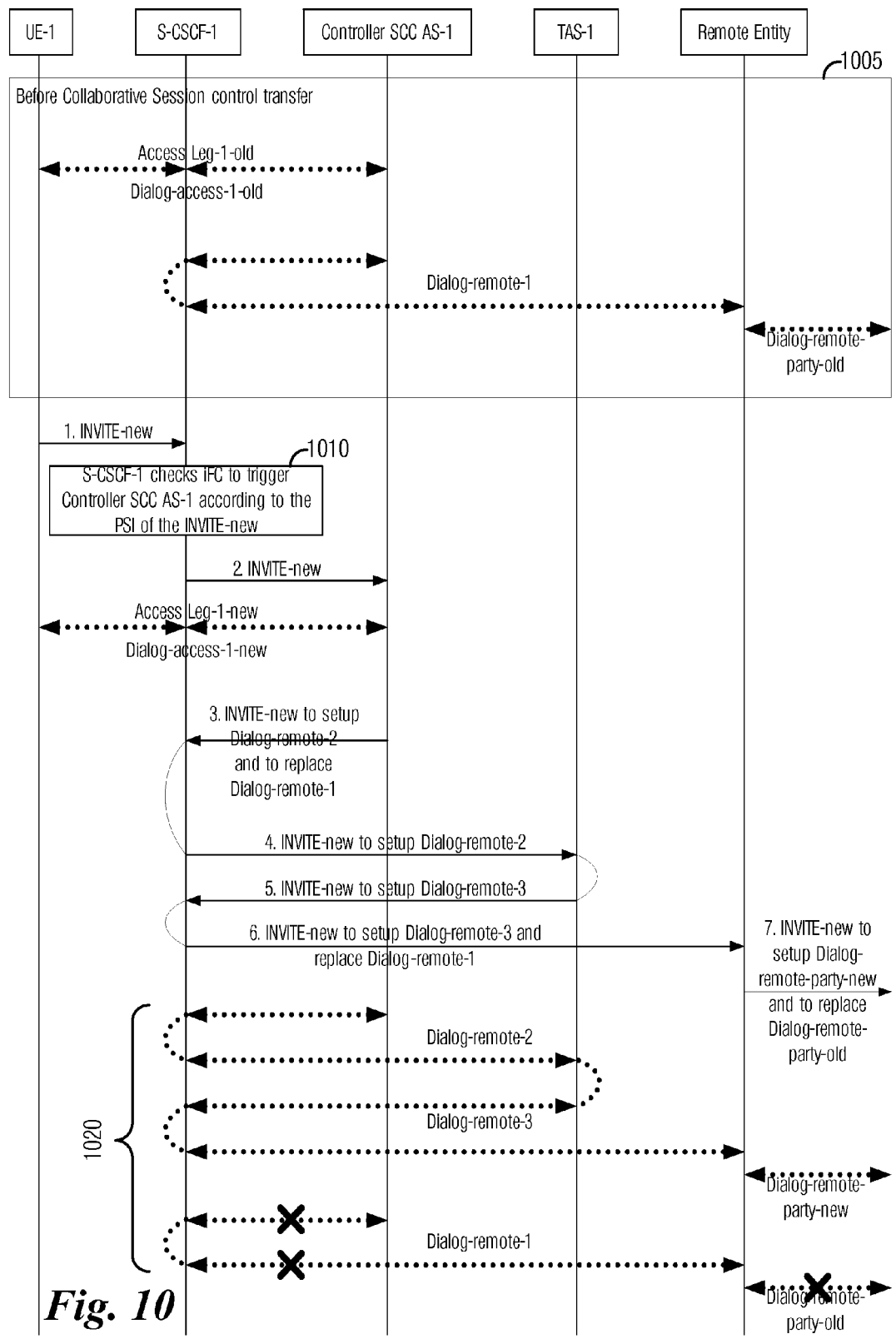
FIG. 10 is a diagram of a call flow for switching the controller UE from UE-2 back to UE-1.

According to an embodiment, switching the controller UE from UE-2 back to UE-1 may be accomplished with S-CSCF (S-CSCF-1) for UE-1 may add TAS-1 to a signaling path of a remote leg. FIG. 10 illustrates a call flow for switching the controller UE from UE-2 back to UE-1. Block 1005 illustrates signaling paths between UE-1, S-CSCF-1, controller AS (controller SCC AS-1) for UE-1, TAS (TAS-1) for UE-1, and remote entities prior to controller UE transfer.

The controller UE transfer may begin with UE-1 sending an invite-new message to the S-CSCF-1 (shown as event #1). After receiving the invite-new message from UE-1, the S-CSCF-1 may check its iFC to trigger the controller SCC AS-1 for UE-1 according to a PSI of the invite-new message (block 1010). The S-CSCF-1 may forward the invite-new message to controller SCC AS-1 (shown as event #2). As a result, a new access leg "Access Leg-1-new" may be created along with a dialog access "Dialog-access-1-new". For events #1 and #2, UE-1 may not need to establish a new dialog to the controller SCC AS-1.

The controller SCC AS-1 may send to the S-CSCF-1 an invite-new message to setup Dialog-remote-2 and to replace Dialog-remote-1 signaling paths (shown as event #3). As a result of the invite-new message from the controller SCC AS-1, the S-CSCF-1 may send an invite-new message to TAS-1 to setup Dialog-remote-2 signaling path (shown as event #4) and the TAS-1 may send an invite-new message to the S-CSCF-1 to setup Dialog-remote-3 signaling path (shown as event #5). Then, the S-CSCF-1 may send an invite-new message to the remote entity to setup Dialog-remote-3 signaling path and to replace Dialog-remote-1 signaling path (shown as event #6). The remote entity may send an invite-new message for the purpose of setup of Dialog-remote-party-new and to replace Dialog-remote-party-old signaling paths (shown as event #7). Span 1020 illustrates signaling paths after controller UE transfer.

The sending of the invite-new message from the controller SCC AS-1 to the S-CSCF-1 may require that Dialog-remote-1 signaling path be replaced and that the controller SCC AS-1 sends the invite-new message with Dialog-remote-1 in the replace header. Since there may be other situations wherein the controller SCC AS-1 sends out invite-new messages with Dialog-remote-2 in the replace header, the controller SCC AS-1 shall be able to identify which dialog to be replaced, e.g., a dialog of access leg out from the controller SCC AS-1 or a dialog of access leg in from the TAS-1.

The sending of the invite-new message to TAS-1 from the S-CSCF-1 may require that the S-CSCF-1 be able to recognize that the invite-new message specifies that Dialog-remote-1 signaling path be replaced. Furthermore, the S-CSCF-1 may be able to send the invite-new message to TAS-1.

The sending of the invite-new message to the S-CSCF-1 from TAS-1 may require that the S-CSCF-1 be able to recognize that the invite-new message specifies that Dialog-remote-1 signaling path be replaced. Additionally, the S-CSCF-1 may be able to send an invite-new message with the replace header containing Dialog-remote-1 in the replace header to the remote entity.

Figure 11A:
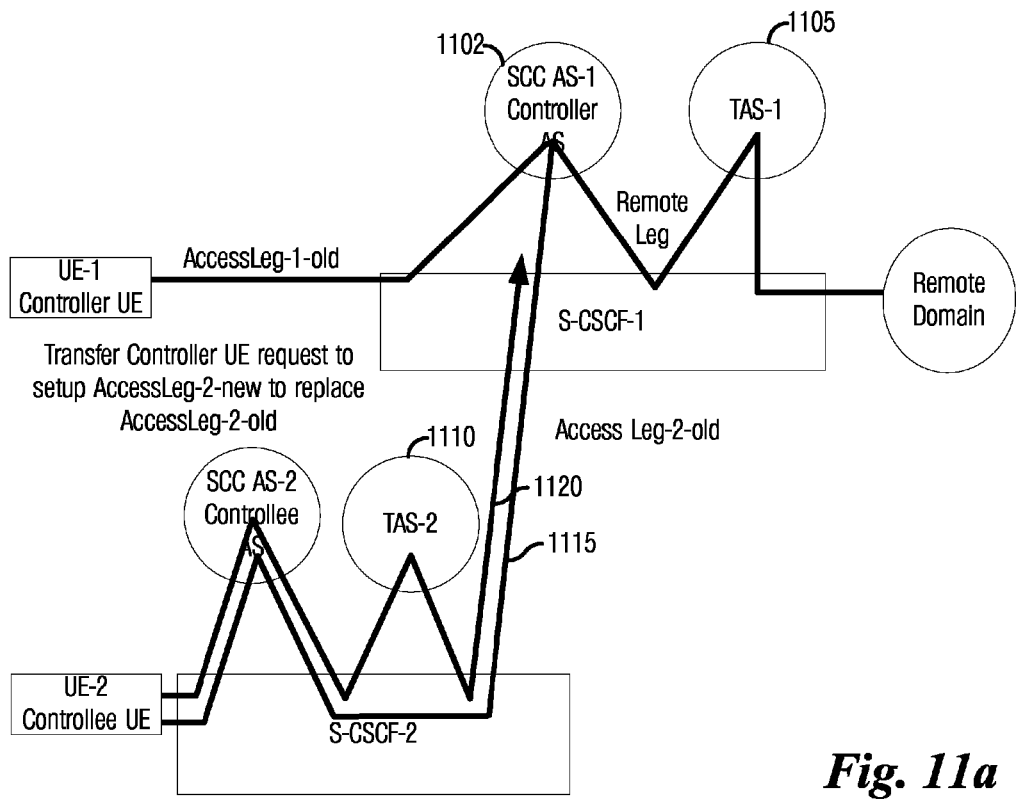
FIG. 11a is a diagram of a MMTel structure for an existing collaborative session between UE-1, UE-2, and a remote end, wherein UE-2 requests to become controller UE.

FIG. 11a illustrates a MMTel structure for an existing collaborative session between UE-1, UE-2, and a remote end, wherein UE-2 requests to become controller UE. Since UE-1 is the controller UE at initiation of the existing collaborative session, SCC AS 1102 of UE-1 is the controller SCC AS-1 and TAS-1 1105 is the TAS of the existing collaborative session. UE-2, in requesting to become the controller UE sends a message to create a new signaling path between itself and the remote entity and UE-1 with the new signaling path going through TAS-2 1110. Signaling path 1115 indicates an existing signaling path for UE-2 while UE-2 is a controlee UE and signaling path 1120 indicates the new signaling path for UE-2.

Figure 11B:
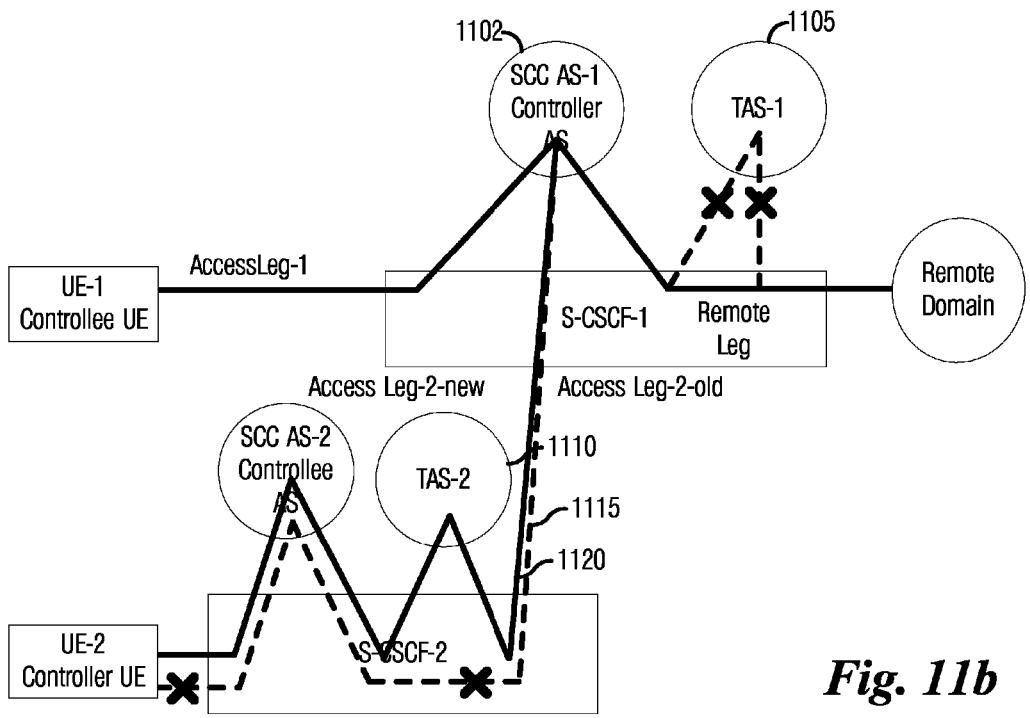
FIG. 11b is a diagram of a MMTel structure for the existing collaborative session between UE-1, UE-2, and a remote end, after UE-2 becomes controller UE.

FIG. 11b illustrates a MMTel structure for the existing collaborative session between UE-1, UE-2, and a remote end, after UE-2 becomes controller UE. After UE-2 becomes controller UE, signaling path 1115 is replaced with signaling path 1120 which includes TAS-2 1110. Furthermore, TAS-1 1105 is removed from the signaling path of the existing collaborative session. However, since a controller SCC AS remains constant for an entirety of a collaborative session, the controller SCC AS remains SCC AS 1102.

Figure 12:
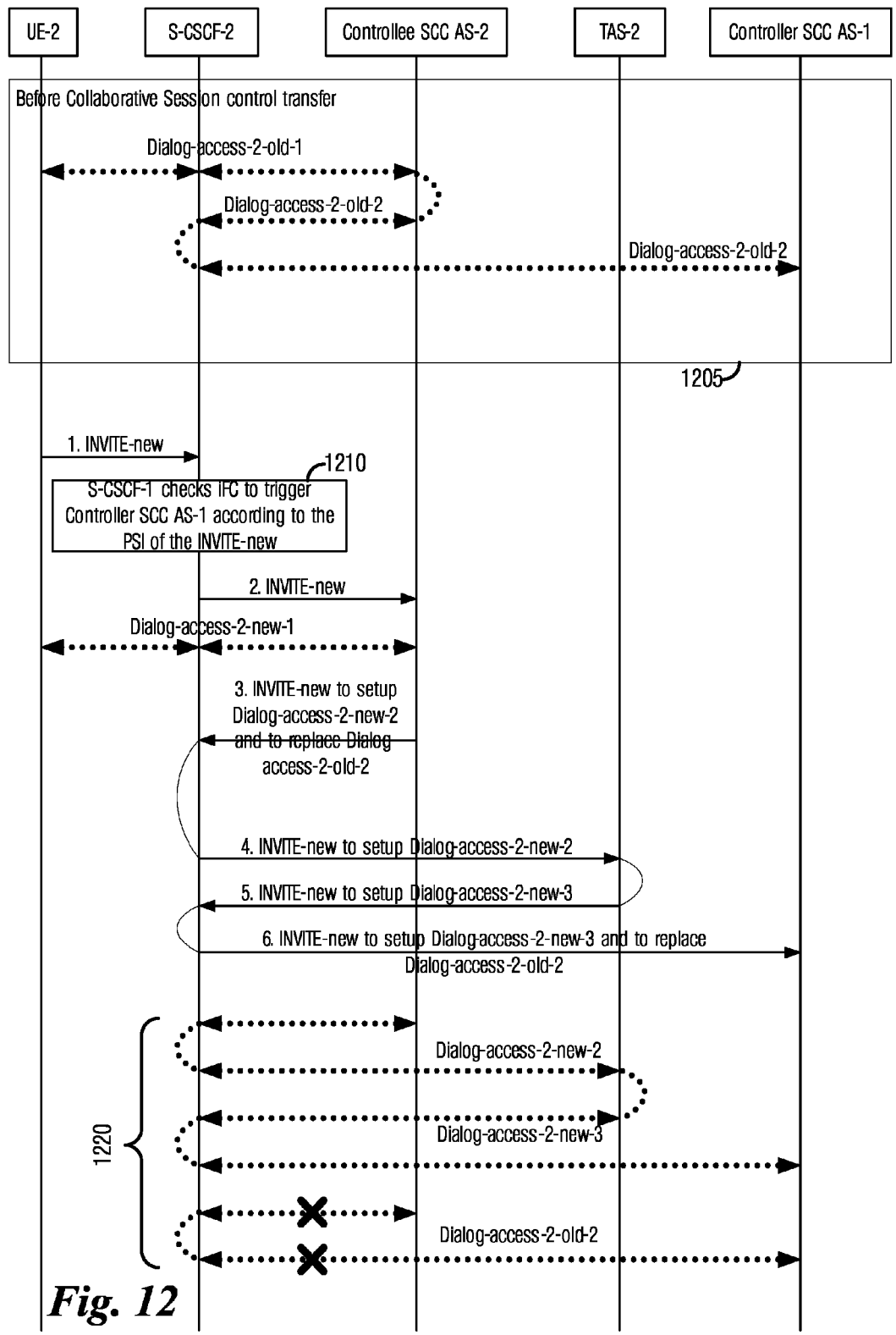
FIG. 12 is a diagram of a call flow for switching the controller UE from UE-1 to UE-2.

According to an embodiment, switching the controller UE to UE-2 may be accomplished with S-CSCF (S-CSCF-2) for UE-2 may add TAS-2 to a signaling path of AccessLeg-2. FIG. 12 illustrates a call flow for switching the controller UE from UE-1 to UE-2. Block 1205 illustrates signaling paths between UE-2, S-CSCF-2, controlee AS (controlee SCC AS-2) for UE-2, TAS (TAS-2) for UE-2, and controller AS (controller SCC AS-1) which also is the AS for UE-1 prior to controller UE transfer.

The controller UE transfer may begin with UE-2 sending an invite-new message to the S-CSCF-2 (shown as event #1). After receiving the invite-new message from UE-2, the S-CSCF-2 may check its iFC to trigger the controlee SCC AS-2 for UE-2 according to a PSI of the invite-new message (block 1210). The S-CSCF-2 may forward the invite-new message to controlee SCC AS-2 (shown as event #2). As a result, a new access leg "Dialog-access-2-new-1" may be created.

Controlee SCC AS-2 may send an invite-new message to S-CSCF-2 to setup Dialog-access-2-new-2 and to replace Dialog-access-2-old-2 (shown as event #3). S-CSCF-2 may send an invite-new message to TAS-2 to setup Dialog-access-2-new-2 (shown as event #4) and TAS-2 may send an invite-new message to S-CSCF-2 to setup Dialog-access-2-new-3 (shown as event #5). Furthermore, S-CSCF-2 may send an invite-new message to controller SCC AS-1 to setup Dialog-access-2-new-3 and to replace Dialog-access-2-old-2 (shown as event #6). Span 1220 illustrates signaling paths after controller UE transfer.

The sending of the invite-new message from the controlee SCC AS-2 to the S-CSCF-2 may require that Dialog-access-2-old-2 signaling path be replaced and that the controlee SCC AS-2 sends the invite-new message with Dialog-access-2-old-2 in the replace header. Since there may be other situations wherein the controlee SCC AS-2 sends out invite-new messages with Dialog-access-2-new-2 in the replace header, the controlee SCC AS-2 shall be able to identify which dialog to be replaced, e.g., a dialog of access leg out from the controlee SCC AS-2 or a dialog of access leg in from the TAS-2.

The sending of the invite-new message to TAS-2 from the S-CSCF-2 may require that the S-CSCF-2 be able to recognize that the invite-new message specifies that Dialog-access-2-old-2 signaling path be replaced. Furthermore, the S-CSCF-2 may be able to send the invite-new message to TAS-2.

The sending of the invite-new message to the S-CSCF-2 from TAS-2 may require that the S-CSCF-2 be able to recognize that the invite-new message specifies that Dialog-access-2-old-2 signaling path be replaced. Additionally, the S-CSCF-2 may be able to send an invite-new message with the replace header containing Dialog-access-2-old-2 in the replace header to the controller SCC AS-1.

MMTel execution may occur without transferring collaborative session control with several preconditions: 1) UE-1 belongs to user-1's subscription and 2) UE-2 belongs to user-2's subscription. In a situation where MMTel execution occurs without transferring collaborative session control, additional preconditions may include UE-1 is the controller UE, UE-1 sets up the collaborative session with a remote party by transferring a second media flow (media flow-2) to UE-2, and the control of the collaborative session remains with UE-1.

Figure 13A:
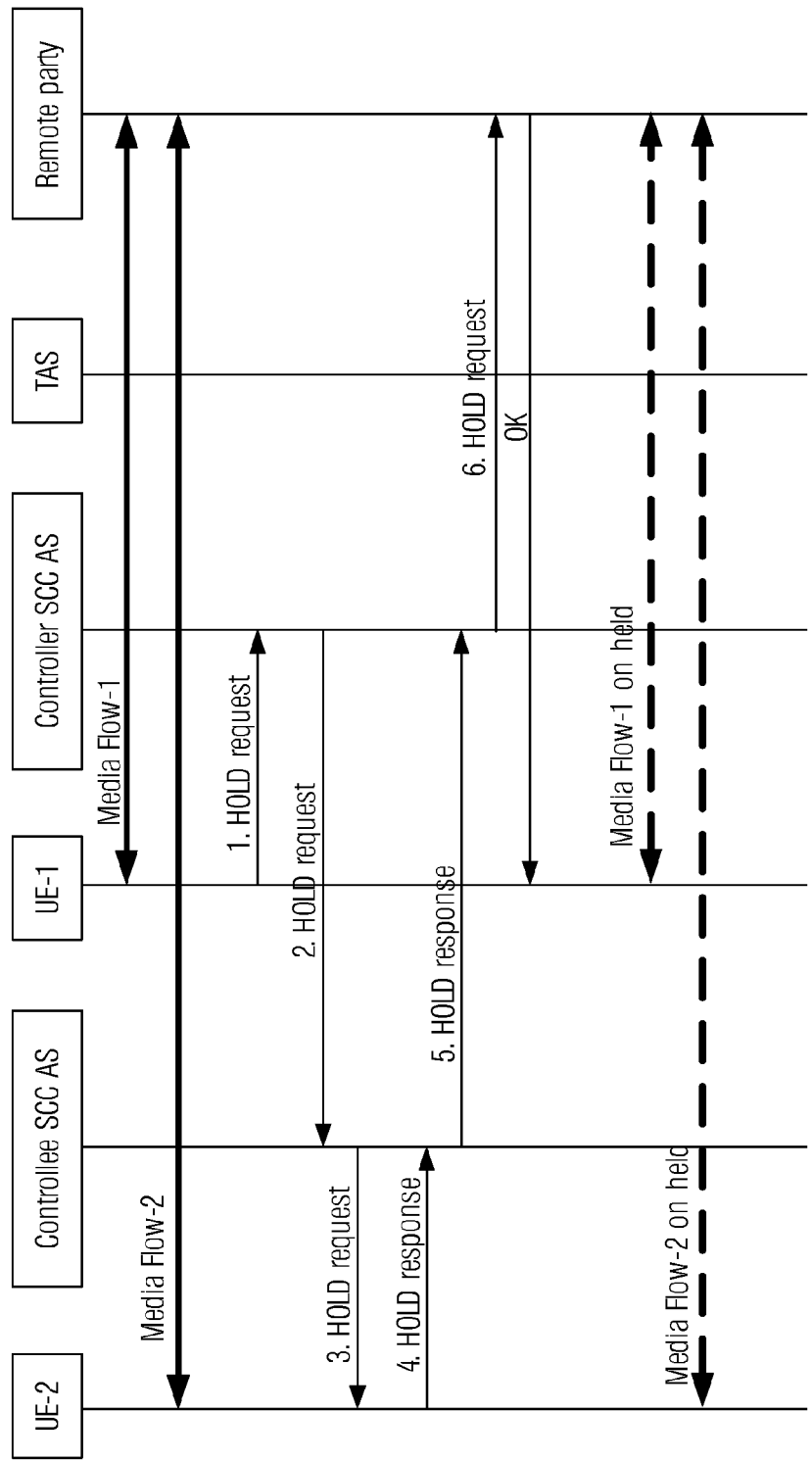
FIG. 13a is a diagram of a call flow in placing a collaborative session on HOLD without announcements.

A collaborative session may be placed on HOLD with or without announcements, initiated by the controller UE (e.g., UE-1). FIG. 13a illustrates a call flow in placing a collaborative session on HOLD without announcements. Placing the collaborative session on HOLD may begin with UE-1 sending a HOLD request to the controller SCC AS (SCC AS-1) (shown as event #1). The controller SCC AS may forward the HOLD request to the controlee SCC AS (SCC AS-2) of UE-2 (shown as event #2), which may send the HOLD request to UE-2 (shown as event #3).

For discussion purposes, let UE-2 agree to the HOLD request and respond with a HOLD response that is an affirmative to the controlee SCC AS (shown as event #4). The controlee SCC AS may respond to the HOLD request from the controller SCC AS with a HOLD response (shown as event #5).

The controller SCC AS may then send a HOLD request to a remote party (or remote parties) of the collaborative session (shown as event #6), which may indicate its (or their) agreement to the HOLD request with an affirmative response (OK). The collaborative session is now on HOLD and no announcements have been made. Since there are no announcements for placing the collaborative session on HOLD, a TAS in a remote leg of the collaborative session does not need to serve.

Several enhancements may be necessary for the controller SCC AS. They include: 1) The controller SCC AS may be able to authorize whether the controller UE can place the collaborative session on HOLD; 2) The controller SCC AS may be able to recognize whether the HOLD request from the controller UE requests to hold media flow(s) in the controlee UE; 3) If the HOLD request from the controller UE requests to hold media flow(s) in the controlee UE, the controller SCC AS may be able to authorize whether the controller UE can hold media flow(s) in the controlee UE; and 4) If the controller UE can hold media flow(s) in the controlee UE, the controller SCC AS may be able to send a HOLD request to a corresponding controlee UE to hold the corresponding media flow(s).

Several enhancements may be necessary for the controlee SCC AS. They include: 1) The controlee SCC AS may be able to recognize the HOLD request from the controller SCC AS; 2) The controller SCC AS may be able to authorize whether the controller UE can hold media flow(s) in the controlee UE; and 3) If the controller UE can hold media flow(s) in the controlee UE, the controlee SCC AS may be able to send HOLD requests to the controlee UE to hold the corresponding media flow(s).

Several enhancements may be necessary for the controlee UE. They include: 1) The controlee UE may be able to recognize the HOLD request from the controlee SCC AS; 2) If user wants to authorize a collaborative session basis, the controlee UE may be able to notify the user to authorize whether the controller UE can hold media flow(s) in the controlee UE; and 3) If the controlee UE agrees to hold corresponding media flow(s), the controlee UE may be able to send a successful response to the controlee SCC AS.

Figure 13B:
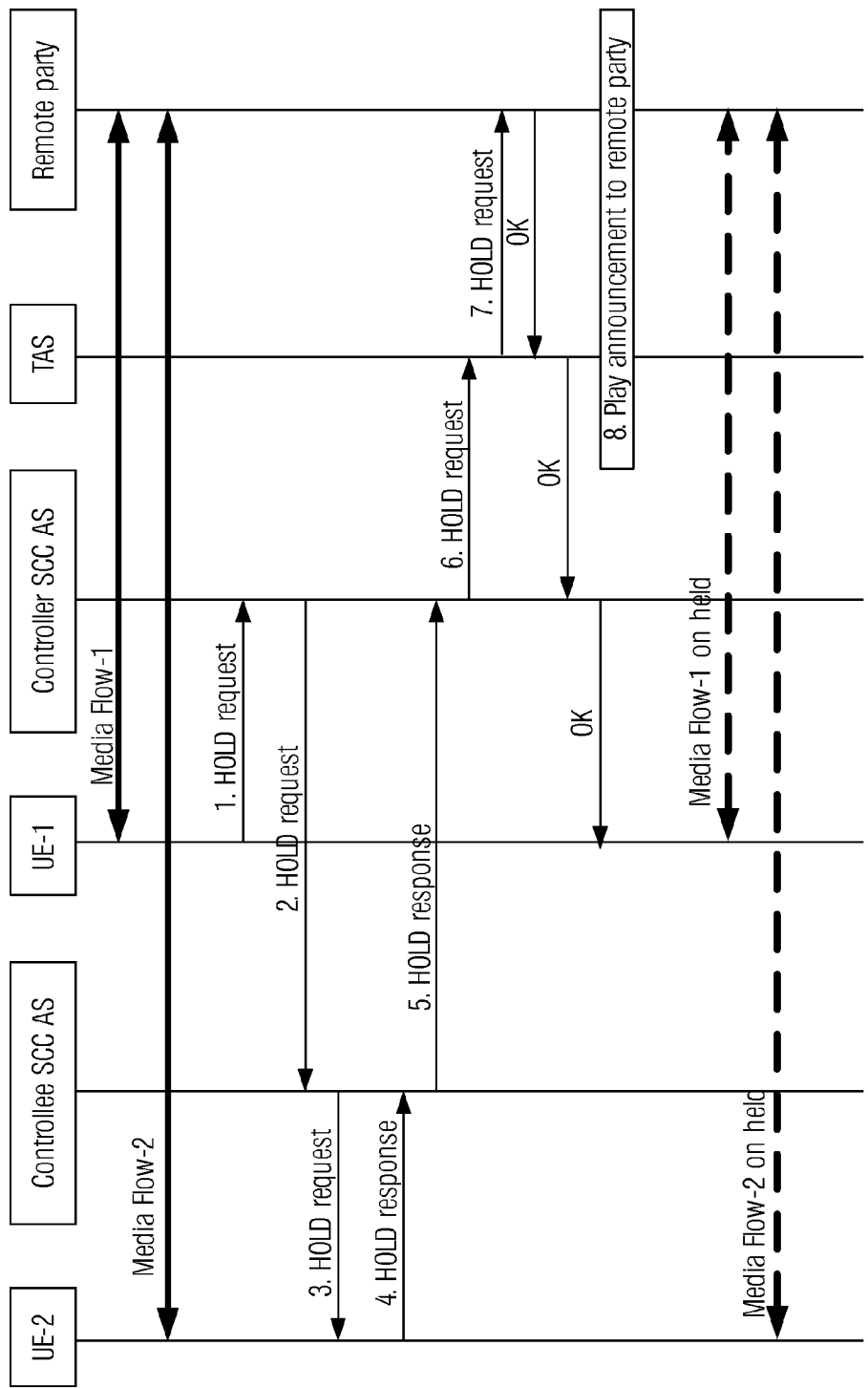
FIG. 13b is a diagram of a call flow in placing a collaborative session on HOLD with announcements.

FIG. 13b illustrates a call flow in placing a collaborative session on HOLD with announcements. Placing the collaborative session on HOLD may begin with UE-1 sending a HOLD request to the controller SCC AS (SCC AS-1) (shown as event #1). The controller SCC AS may forward the HOLD request to the controlee SCC AS (SCC AS-2) of UE-2 (shown as event #2), which may send the HOLD request to UE-2 (shown as event #3).

For discussion purposes, let UE-2 agree to the HOLD request and respond with a HOLD response that is an affirmative to the controlee SCC AS (shown as event #4). The controlee SCC AS may respond to the HOLD request from the controller SCC AS with a HOLD response (shown as event #5).

The controller SCC AS may then send a HOLD request to a TAS of the remote leg (shown as event #6), which may forward the HOLD request to the remote party (or remote parties) (shown as event #7). The remote party (or parties) may indicate its (or their) agreement to the HOLD request with an affirmative response (OK) that may propagate back to UE-1. Announcements may be made for the remote party (parties) (shown as event #8). The collaborative session is now on HOLD and announcements have been made. Since announcements for placing the collaborative session on HOLD were made, a TAS in a remote leg of the collaborative session was triggered and served the HOLD session request. The TAS may be triggered by a S-CSCF serving the controller UE according to user-1's subscription iFC when setting up the remote leg to the remote party (parties).

Several enhancements may be necessary for the controller SCC AS. They include: 1) The controller SCC AS may be able to authorize whether the controller UE can place the collaborative session on HOLD; 2) The controller SCC AS may be able to recognize whether the HOLD request from the controller UE requests to hold media flow(s) in the controlee UE; 3) If the HOLD request from the controller UE requests to hold media flow(s) in the controlee UE, the controller SCC AS may be able to authorize whether the controller UE can hold media flow(s) in the controlee UE; and 4) If the controller UE can hold media flow(s) in the controlee UE, the controller SCC AS may be able to send a HOLD request to a corresponding controlee UE to hold the corresponding media flow(s).

Several enhancements may be necessary for the controlee SCC AS. They include: 1) The controlee SCC AS may be able to recognize the HOLD request from the controller SCC AS; 2) The controller SCC AS may be able to authorize whether the controller UE can hold media flow(s) in the controlee UE; and 3) If the controller UE can hold media flow(s) in the controlee UE, the controlee SCC AS may be able to send HOLD requests to the controlee UE to hold the corresponding media flow(s).

Several enhancements may be necessary for the controlee UE. They include: 1) The controlee UE may be able to recognize the HOLD request from the controlee SCC AS; 2) If user wants to authorize a collaborative session basis, the controlee UE may be able to notify the user to authorize whether the controller UE can hold media flow(s) in the controlee UE; and 3) If the controlee UE agrees to hold corresponding media flow(s), the controlee UE may be able to send a successful response to the controlee SCC AS.

The controller SCC AS may forward HOLD requests to the S-CSCF serving UE-1. The S-CSCF serving UE-1 may forward the HOLD request to the TAS. The TAS may be able to authorize HOLD requests according to user-1's subscription. If user-1 subscribes HOLD service, the TAS may be able to select an announcement according to user-1's subscription. The TAS may prepare resources for the announcement and sends the HOLD request with SDP of announcement resources to the remote party. When the remote party accepts the HOLD request, the TAS plays an announcement to the remote party.

Figure 14A:
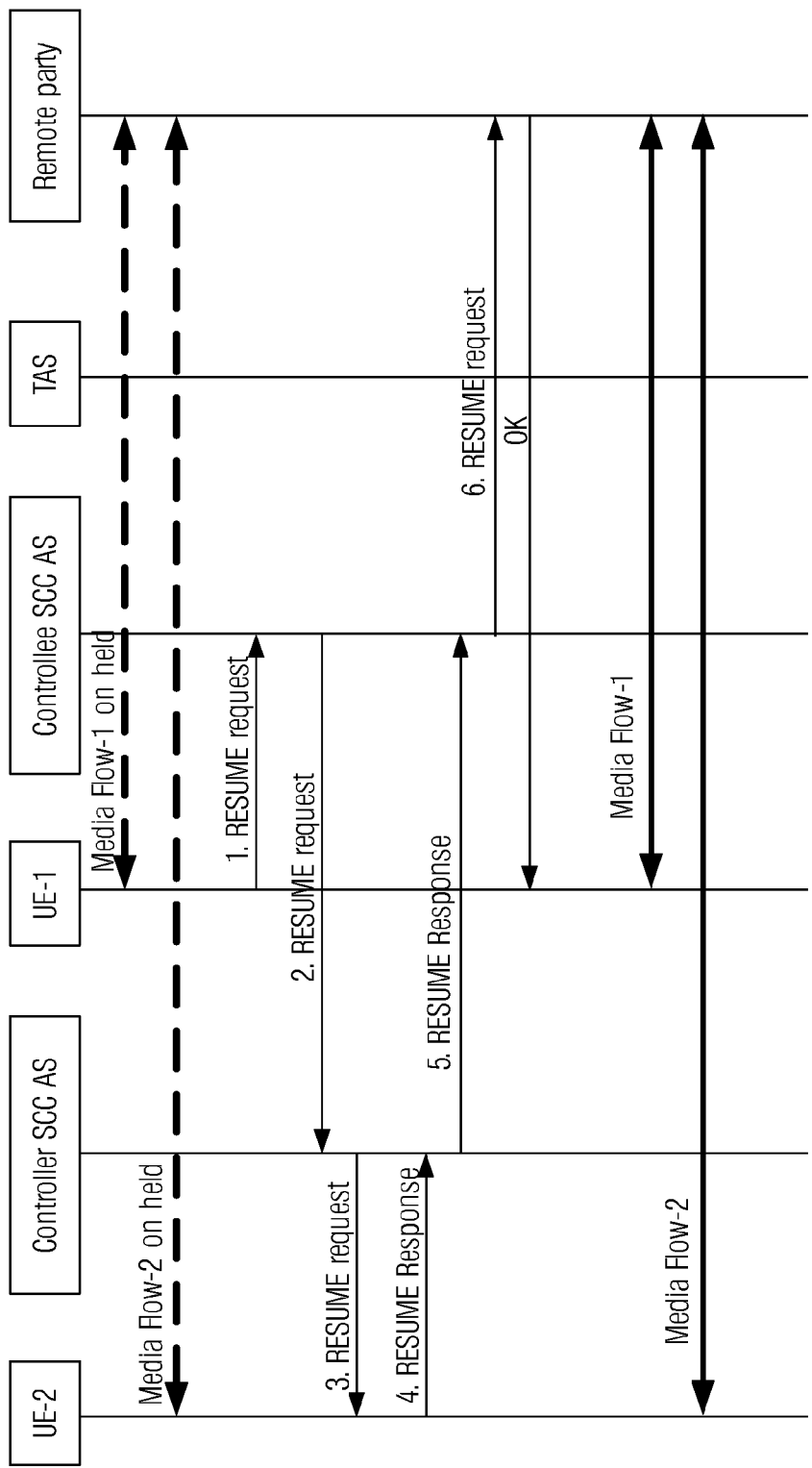
FIG. 14a is a diagram of a call flow to RESUME a collaborative session on HOLD without announcements.

A collaborative session already on HOLD may be resumed with or without announcements, initiated by the controller UE (e.g., UE-1). FIG. 14a illustrates a call flow to RESUME a collaborative session on HOLD without announcements. Resuming a collaborative session on HOLD may begin with UE-1 sending a RESUME request to the controller SCC AS (SCC AS-1) (shown as event #1). The controller SCC AS may forward the RESUME request to the controlee SCC AS (SCC AS-2) of UE-2 (shown as event #2), which may send the RESUME request to UE-2 (shown as event #3).

For discussion purposes, let UE-2 agree to the RESUME request and respond with a RESUME response that is an affirmative to the controlee SCC AS (shown as event #4). The controlee SCC AS may respond to the RESUME request from the controller SCC AS with a RESUME response (shown as event #5).

The controller SCC AS may then send a RESUME request to a remote party (or remote parties) of the collaborative session (shown as event #6), which may indicate its (or their) agreement to the RESUME request with an affirmative response (OK). The collaborative session is now active once again and no announcements have been made. Since there are no announcements for resuming the collaborative session, a TAS in a remote leg of the collaborative session does not need to serve.

Several enhancements may be necessary for the controller SCC AS. They include: 1) The controller SCC AS may be able to authorize whether the controller UE can resume the collaborative session; 2) The controller SCC AS may be able to recognize whether the RESUME request from the controller UE requests to resume media flow(s) in the controlee UE; 3) If the RESUME request from the controller UE requests to resume media flow(s) in the controlee UE, the controller SCC AS may be able to authorize whether the controller UE can resume media flow(s) in the controlee UE; and 4) If the controller UE can resume media flow(s) in the controlee UE, the controller SCC AS may be able to send a RESUME request to a corresponding controlee UE to resume the corresponding media flow(s).

Several enhancements may be necessary for the controlee SCC AS. They include: 1) The controlee SCC AS may be able to recognize the RESUME request from the controller SCC AS; 2) The controller SCC AS may be able to authorize whether the controller UE can resume media flow(s) in the controlee UE; and 3) If the controller UE can hold media flow(s) in the controlee UE, the controlee SCC AS may be able to send RESUME requests to the controlee UE to resume the corresponding media flow(s).

Several enhancements may be necessary for the controlee UE. They include: 1) The controlee UE may be able to recognize the RESUME request from the controlee SCC AS; 2) If user wants to authorize a collaborative session basis, the controlee UE may be able to notify the user to authorize whether the controller UE can resume media flow(s) in the controlee UE; and 3) If the controlee UE agrees to resume corresponding media flow(s), the controlee UE may be able to send a successful response with a new SDP offer of the resumed media flow(s) to the controlee SCC AS.

Figure 14B:
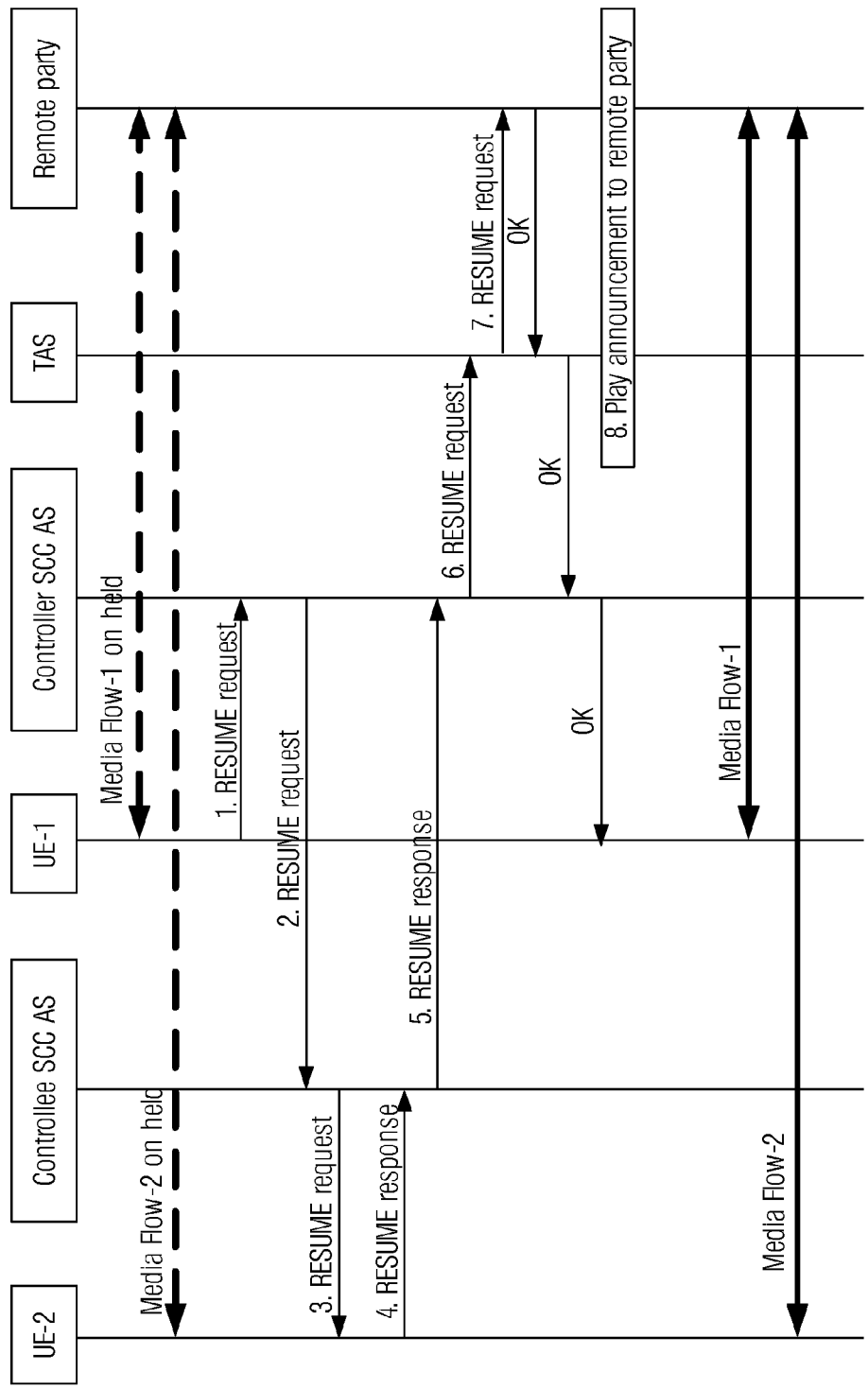
FIG. 14b is a diagram of a call flow to RESUME a collaborative session on HOLD with announcements.

FIG. 14b illustrates a call flow to RESUME a collaborative session on HOLD with announcements. Resuming a collaborative session on HOLD may begin with UE-1 sending a RESUME request to the controller SCC AS (SCC AS-1) (shown as event #1). The controller SCC AS may forward the RESUME request to the controlee SCC AS (SCC AS-2) of UE-2 (shown as event #2), which may send the RESUME request to UE-2 (shown as event #3).

For discussion purposes, let UE-2 agree to the RESUME request and respond with a RESUME response that is an affirmative to the controlee SCC AS (shown as event #4). The controlee SCC AS may respond to the RESUME request from the controller SCC AS with a RESUME response (shown as event #5).

The controller SCC AS may then send a RESUME request to a TAS of the remote leg (shown as event #6), which may forward the RESUME request to the remote party (or remote parties) (shown as event #7). The remote party (or parties) may indicate its (or their) agreement to the RESUME request with an affirmative response (OK) that may propagate back to UE-1. Announcements may be made for the remote party (parties) (shown as event #8). The collaborative session is now active and announcements have been made. Since announcements for resuming the collaborative session were made, a TAS in a remote leg of the collaborative session was triggered and served the RESUME session request. The TAS may be triggered by a S-CSCF serving the controller UE according to user-1's subscription iFC when setting up the remote leg to the remote party (parties).

Several enhancements may be necessary for the controller SCC AS. They include: 1) The controller SCC AS may be able to authorize whether the controller UE can resume the collaborative session; 2) The controller SCC AS may be able to recognize whether the RESUME request from the controller UE requests to resume media flow(s) in the controlee UE; 3) If the RESUME request from the controller UE requests to resume media flow(s) in the controlee UE, the controller SCC AS may be able to authorize whether the controller UE can resume media flow(s) in the controlee UE; and 4) If the controller UE can resume media flow(s) in the controlee UE, the controller SCC AS may be able to send a RESUME request to a corresponding controlee UE to resume the corresponding media flow(s).

Several enhancements may be necessary for the controlee SCC AS. They include: 1) The controlee SCC AS may be able to recognize the RESUME request from the controller SCC AS; 2) The controller SCC AS may be able to authorize whether the controller UE can resume media flow(s) in the controlee UE; and 3) If the controller UE can hold media flow(s) in the controlee UE, the controlee SCC AS may be able to send RESUME requests to the controlee UE to resume the corresponding media flow(s).

Several enhancements may be necessary for the controlee UE. They include: 1) The controlee UE may be able to recognize the RESUME request from the controlee SCC AS; 2) If user wants to authorize a collaborative session basis, the controlee UE may be able to notify the user to authorize whether the controller UE can resume media flow(s) in the controlee UE; and 3) If the controlee UE agrees to resume corresponding media flow(s), the controlee UE may be able to send a successful response with a new SDP offer of the resumed media flow(s) to the controlee SCC AS.

The controller SCC AS may forward the RESUME request to the S-CSCF serving UE-1. The S-CSCF serving UE-1 may then forward the resume request to the TAS. The TAS may be able to authorize the RESUME request according to user-1's subscription. If user-1 subscribes to the RESUME service, the TAS may be able to select an announcement according to user-1' subscription. The TAS prepares resources for the announcement and sends the RESUME request to the remote party. When the remote party accepts the RESUME request, the TAS may play a corresponding announcement to the remote party.

Figure 15A:
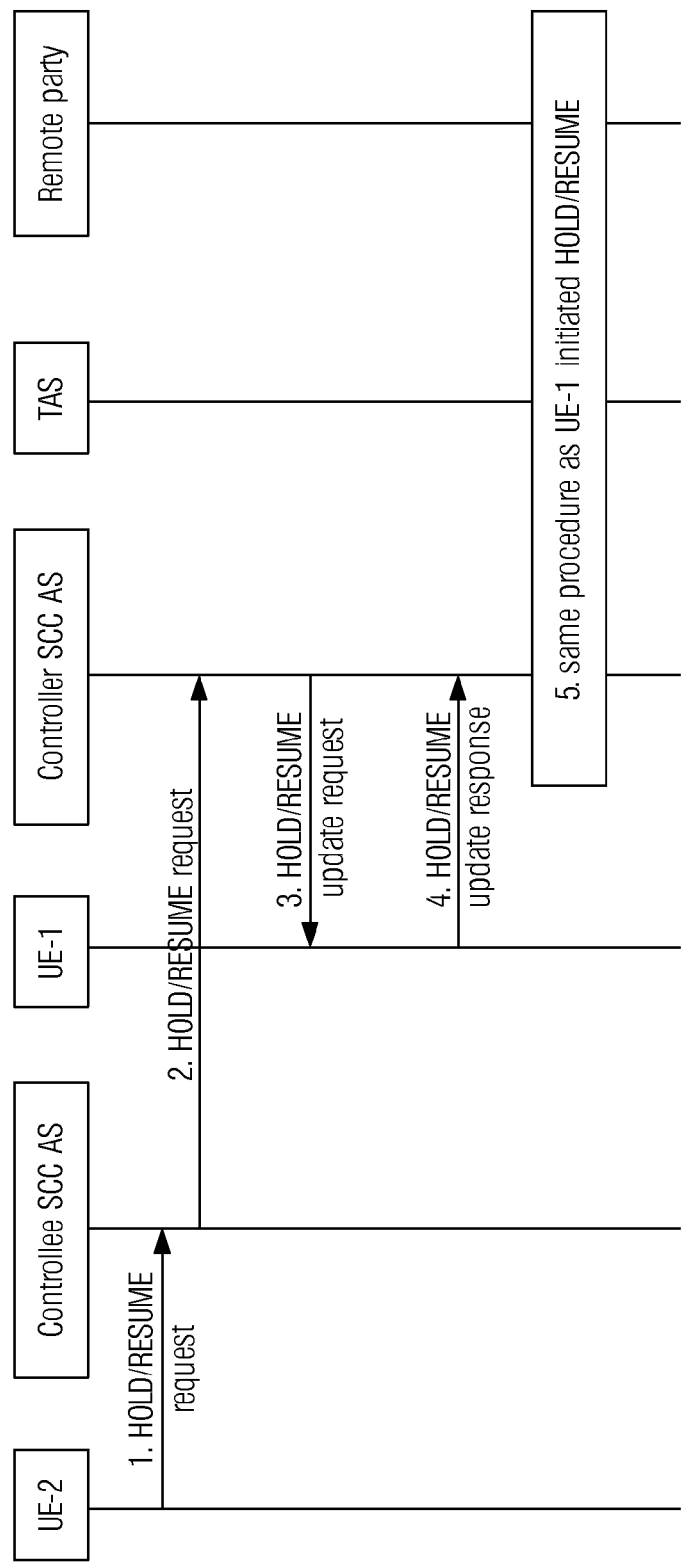
FIG. 15a is a diagram of a call flow in a controlee UE initiated HOLD/RESUME of a collaborative session without a TAS in an access leg of the controlee UE.

A controlee UE of a collaborative session may also initiate MMTel executions. FIG. 15a illustrates a call flow in a controlee UE initiated HOLD/RESUME of a collaborative session without a TAS in an access leg of the controlee UE. Controlee UE initiated HOLD/RESUME of a collaborative session may begin with the controlee UE (e.g., UE-2) sending a HOLD or RESUME request to a controlee SCC AS (e.g., SCC AS-2) for UE-2 (shown as event #1). The controlee SCC AS may forward the HOLD or RESUME request to a controller SCC AS (e.g., SCC AS-1) (shown as event #2).

The controller SCC AS may send the HOLD or RESUME update request to the controller UE (e.g., UE-1) (shown as event #3), which may respond with an affirmative or negative depending on how it wishes to respond to the request (shown as event #4). A remainder of the controlee UE initiated HOLD/RESUME of a collaborative session is identical to the controller UE initiate HOLD/RESUME of a collaborative session discussed previously.

Several enhancements may be necessary for the controlee SCC AS. They include: 1) The controlee SCC AS may be able to recognize the HOLD/RESUME request from the controlee UE; and 2) If the controlee UE can HOLD/RESUME media flow(s) in itself, the controlee SCC AS may be able to forward the HOLD/RESUME request to the controller SCC AS.

Several enhancements may be necessary for the controller SCC AS. They include: 1) The controller SCC AS may be able to recognize the HOLD/RESUME request from the controlee SCC AS; 2) The controller SCC AS may be able to authorize whether the controlee UE can HOLD/RESUME media flow(s) in itself; and 3) If user-1's subscription allows the controlee UE to HOLD/RESUME media flow(s) in itself, the controller SCC AS may be able to execute the sending of the HOLD/RESUME update request to UE-1.

Several enhancements may be necessary for the controller UE. They include: 1) The controller UE may be able to recognize HOLD/RESUME requests from the controlee UE; and 2) The controller UE may be able to update media information according to the HOLD/RESUME request from the controlee UE and successfully send a response to the controller SCC AS.

Additionally, the controller SCC AS may execute the same procedures as in the controller UE initiated HOLD/RESUME of a collaborative session.

Figure 15B:
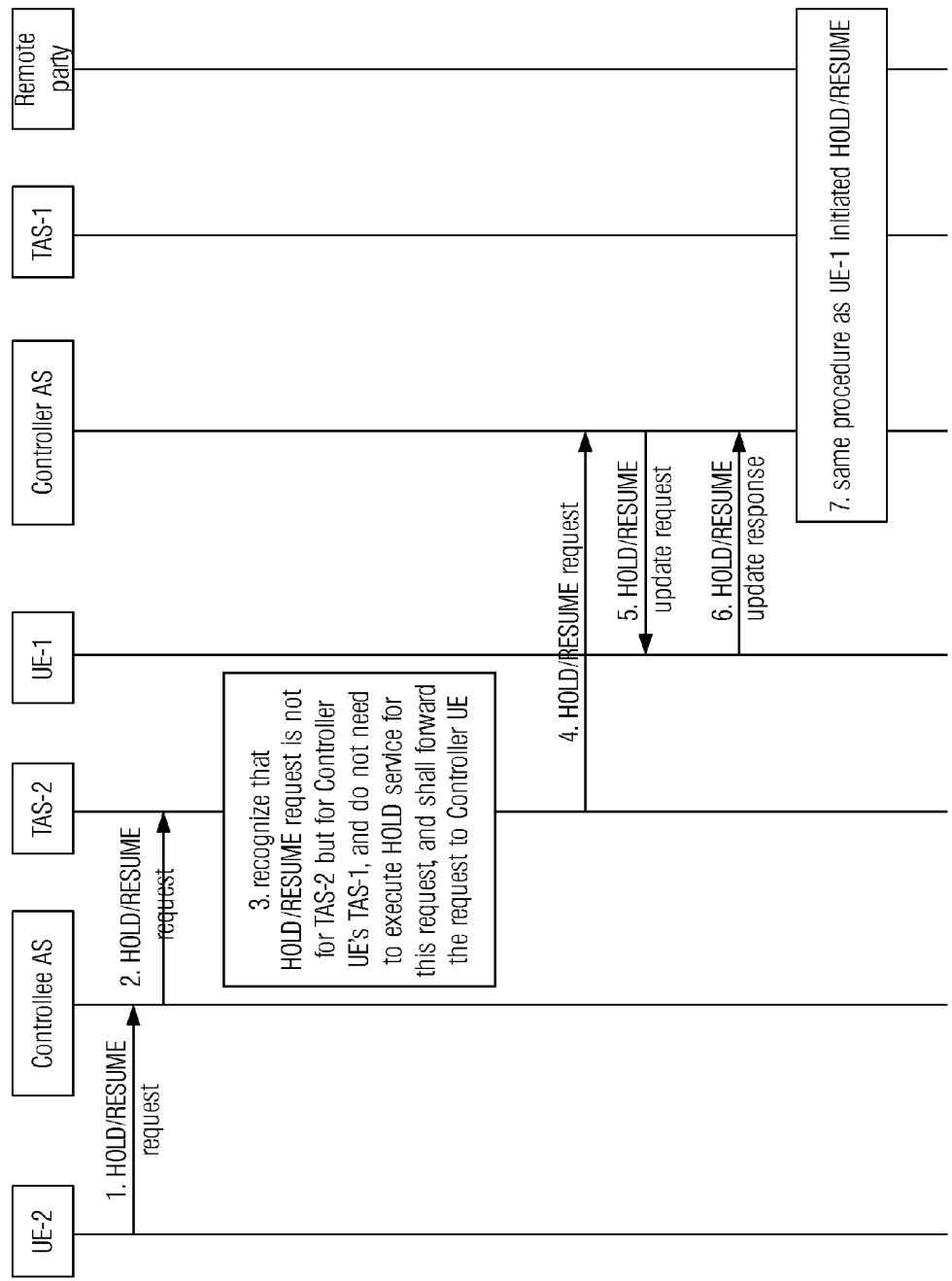
FIG. 15b is a diagram of a call flow in a controlee UE initiate HOLD/RESUME of a collaborative session with an enhanced TAS in an access leg of the controlee UE.

FIG. 15b illustrates a call flow in a controlee UE initiate HOLD/RESUME of a collaborative session with an enhanced TAS in an access leg of the controlee UE. Controlee UE initiated HOLD/RESUME of a collaborative session may begin with the controlee UE (e.g., UE-2) sending a HOLD or RESUME request to a controlee SCC AS (e.g., SCC AS-2) for UE-2 (shown as event #1). The controlee SCC AS may forward the HOLD or RESUME request to a TAS for UE-2 (e.g., TAS-2) (shown as event #2).

The TAS-2 may recognize that the HOLD/RESUME request is not for itself but for the controller UE's TAS (e.g., TAS-1). Therefore, TAS-2 may not need to execute HOLD/RESUME service for the HOLD/RESUME request and simply forward the HOLD/RESUME request to the controller UE (shown as event #3). The TAS-2 may forward the HOLD/RESUME request to a controller SCC AS (e.g., SCC AS-1) (shown as event #4).

The controller SCC AS may send a HOLD/RESUME update request to UE-1 (shown as event #5), which may respond with an affirmative or negative depending on how it wishes to respond to the request (shown as event #6). A remainder of the controlee UE initiated HOLD/RESUME of a collaborative session is identical to the controller UE initiate HOLD/RESUME of a collaborative session discussed previously.

If there is announcement of either the HOLD or RESUME execution, a TAS may be triggered in a remote leg of the collaborative session and the TAS may serve for the HOLD or RESUME collaborative session request. The TAS may be triggered by a S-CSCF serving the controller UE according to user-1's subscription iFC when setting up the remote leg to the remote party.

Several enhancements may be necessary for the TAS-2. They include: 1) The TAS-2 may be able to recognize that the HOLD/RESUME request is not for the TAS-2 but for TAS-1; 2) The TAS-2 may not execute HOLD service for the request; and 3) The TAS-2 may forward the request to the controller SCC AS.

Figure 15C:
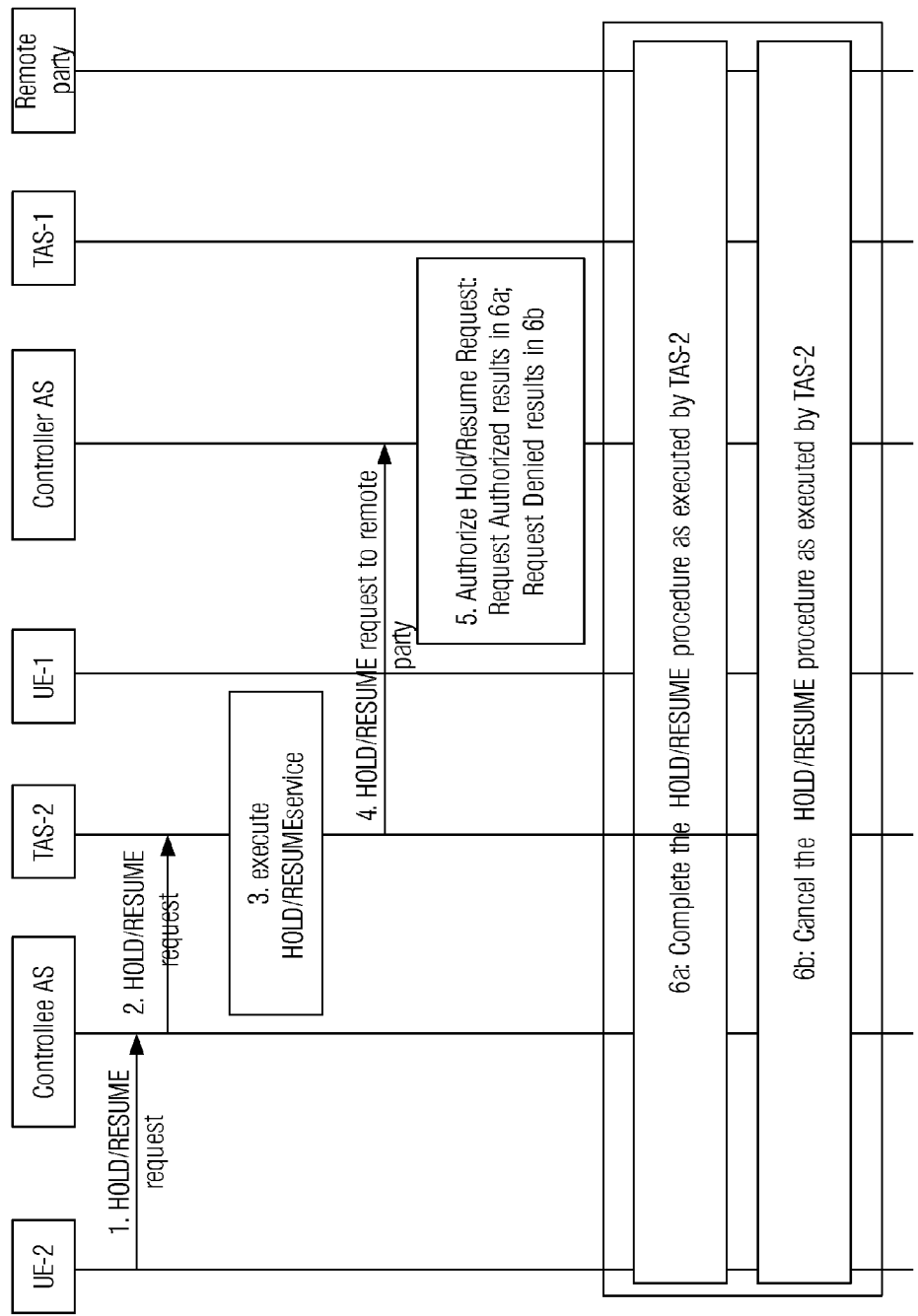
FIG. 15c is a diagram of a call flow in a controlee UE initiate HOLD/RESUME of a collaborative session with a standard TAS in an access leg of the controlee UE.

FIG. 15c illustrates a call flow in a controlee UE initiate HOLD/RESUME of a collaborative session with a standard TAS in an access leg of the controlee UE. Controlee UE initiated HOLD/RESUME of a collaborative session may begin with the controlee UE (e.g., UE-2) sending a HOLD or RESUME request to a controlee SCC AS (e.g., SCC AS-2) for UE-2 (shown as event #1). The controlee SCC AS may forward the HOLD or RESUME request to a TAS for UE-2 (e.g., TAS-2) (shown as event #2).

The TAS-2 may then execute the HOME/RESUME service (shown as event #3) and send the HOLD/RESUME request to a remote party of the collaborative session by way of a controller SCC AS (e.g., SCC AS of UE-1) (shown as event #4). The HOLD/RESUME request may be forwarded on to a remote leg of the collaborative session (e.g., the controller SCC AS) may the TAS-2. The controller SCC AS may then authorize the HOLD/RESUME request, which may be authorized or not authorized (shown as event #5). The authorization of the HOLD/RESUME request verifies if the controlee UE is authorized to perform the HOLD/RESUME service for affected media and whether there are any requests from other UEs. If so, the controller SCC AS may arbitrate.

If the HOLD/RESUME request is authorized, then the HOLD/RESUME procedure as executed by the TAS-2 may be completed (shown as event #6a). The HOLD/RESUME request may be forwarded to the remote party without further action. An acknowledgement may be sent to the TAS-2.

If the HOLD/RESUME request is not authorized, then the HOLD/RESUME procedure as executed by the TAS-2 may be halted (shown as event #6b). The controller SCC AS may cancel the SDP changes and announcements started by the TAS-2 in response to the operations taken by the TAS-2.

MMTel execution may also occur after transferring collaborative session control with several preconditions: 1) UE-1 is the controller UE, 2) UE-1 sets up the collaborative session with a remote party by transferring media flow-2 to UE-2, and 3) collaborative session control is transferred to UE-2.

FIG. 16a illustrates a MMTel structure after transferring collaborative session control from UE-1 to UE-2.

Figure 16B:
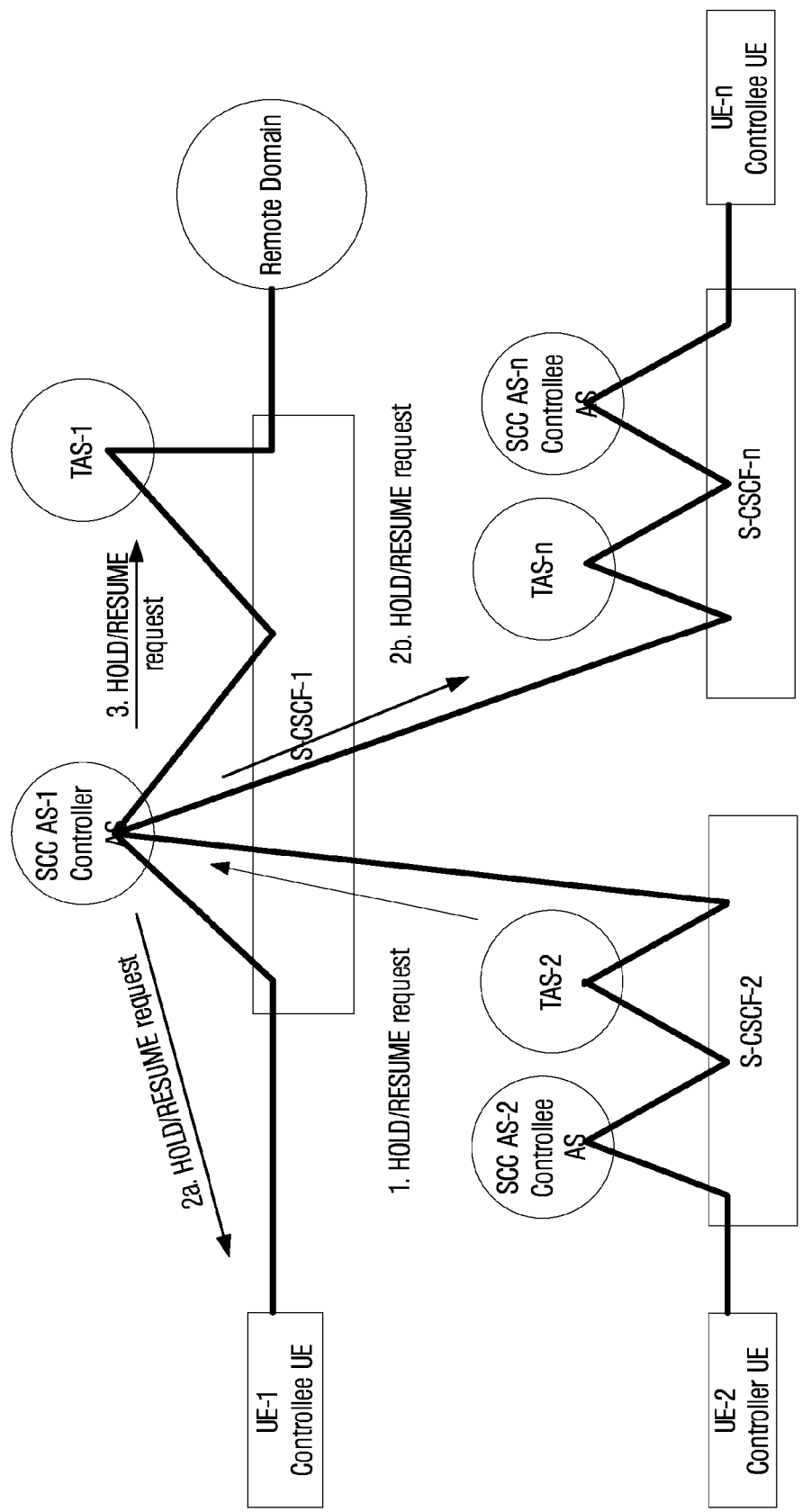
FIG. 16b is a diagram of a MMTel structure after transferring collaborative session control with steps in MMTel execution highlighted.

FIG. 16b illustrates a MMTel structure after transferring collaborative session control with steps in MMTel execution highlighted. A first step of MMTel execution may involve UE-2 sending a HOLD/RESUME request to the controller SCC AS (shown as step #1). The controller SCC AS may forward the HOLD/RESUME request to controller UE and controlee UEs of the collaborative session, for example, UE-1 through UE-n with exception of UE-2 (shown as steps #2a and 2b). The controller SCC AS may also forward the HOLD/ RESUME request to a remote party by accessing a remote leg of the collaborative session by way of TAS-1 (shown as step #3).

In steps #1 and #3 shown above, if UE-1 and UE-2 are all subscribed to play announcements, TAS-1 and TAS-2 may play announcements at the same time as announcements are made at the remote party.

Figure 16C:
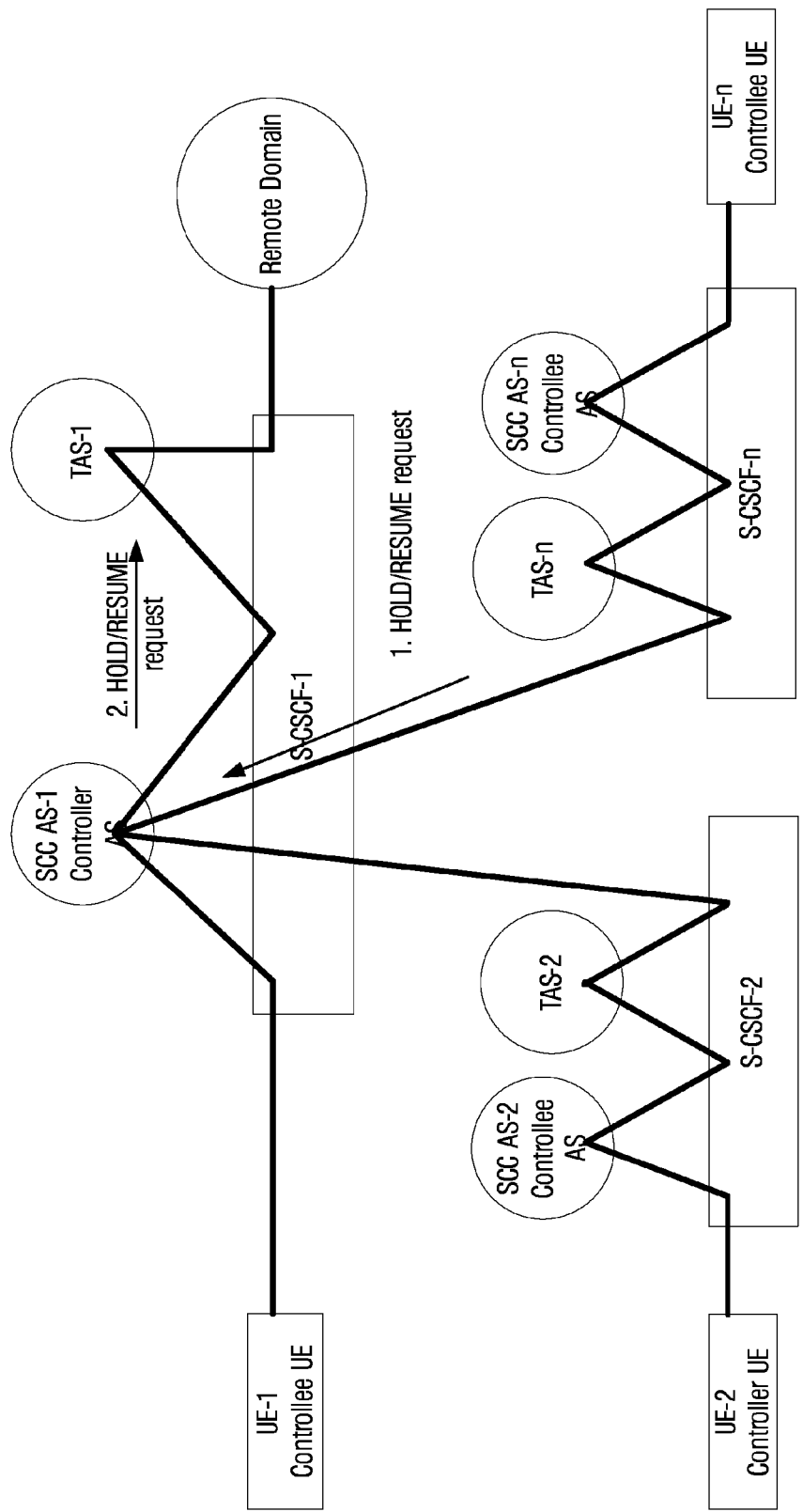
FIG. 16c is a diagram of a MMTel structure after transferring collaborative session control with steps in MMTel execution highlighted.

FIG. 16c illustrates a MMTel structure after transferring collaborative session control with steps in MMTel execution highlighted. A first step of MMTel execution may involve UE-n sending a HOLD/RESUME request to the controller SCC AS of the collaborative session (shown as step #1), which may send the HOLD/RESUME request to a remote party of the collaborative session through a remote leg of the collaborative session by way of TAS-1 (shown as step #2).

In steps #1 and #2 shown above, if UE-1 and UE-n are all subscribed to play announcements, TAS-1 and TAS-n may play announcements at the same time as announcements are made at the remote party.

Figures 17A, 17B:
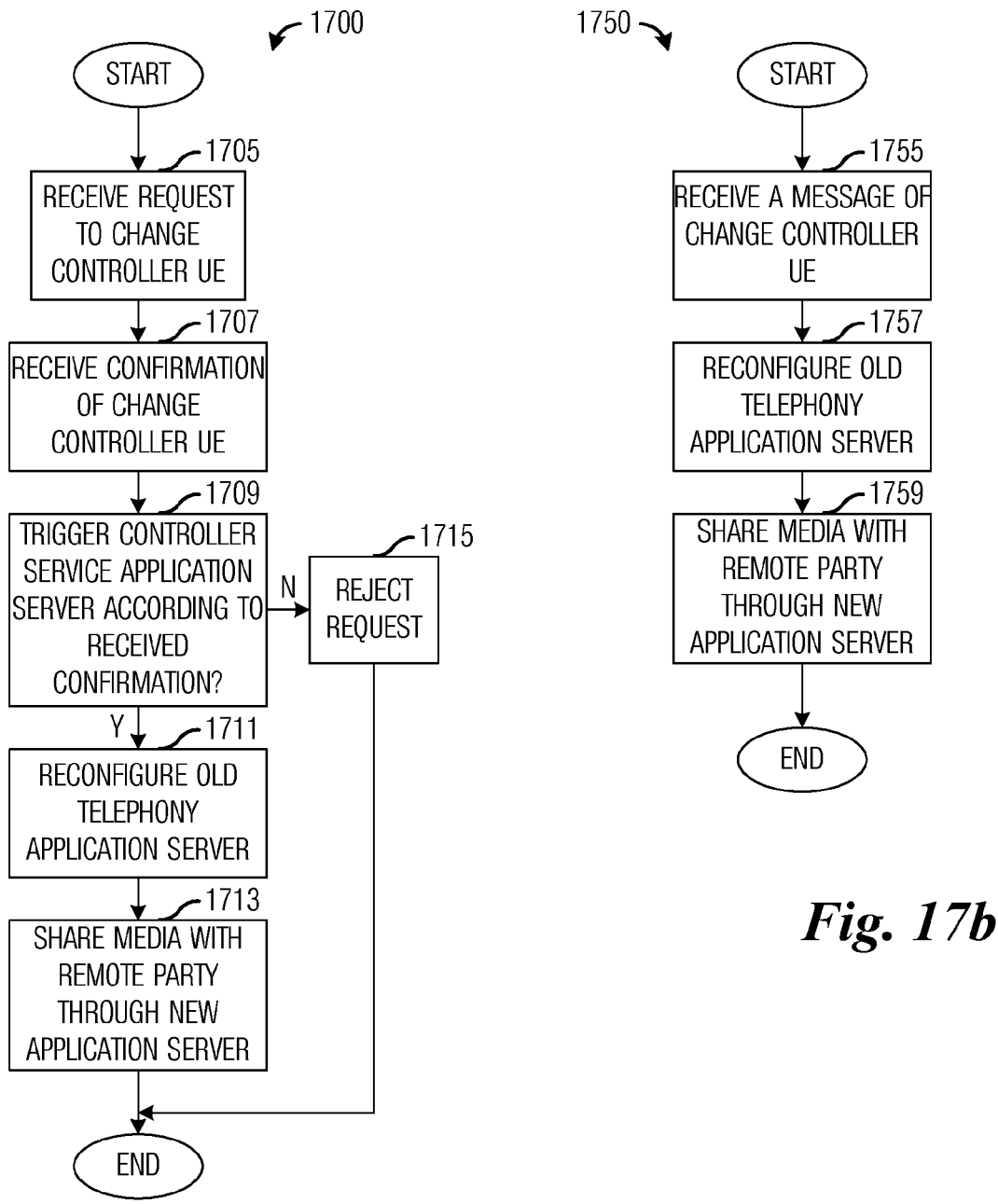
FIG. 17a is a flow diagram of S-CSCF operations in reconfiguring a collaborative session due to a controller UE change.
FIG. 17b is a flow diagram of controller SCC AS operations in reconfiguring a collaborative session due to a controller UE change.

FIG. 17a illustrates a flow diagram of S-CSCF operations 1700 in reconfiguring a collaborative session due to a controller UE change. S-CSCF operations 1700 may be indicative of operations occurring in a S-CSCF of a controller UE as the controller UE changes from a first UE to a second UE. S-CSCF operations 1700 may occur while the S-CSCF is in a normal operating mode.

S-CSCF operations 1700 may begin with the S-CSCF receiving a request to change the controller UE (block 1705). According to an embodiment, the request to change the controller UE may have originated from a UE that desires to become the controller UE, e.g., the second UE. The S-CSCF may also receive a confirmation from the controller UE, e.g., the first UE, to go ahead and change the controller UE to the second UE (block 1707). The confirmation from the controller UE may be in the form of an invite-new message from the controller UE.

The S-CSCF may determine whether or not to trigger a controller SCC AS based on a PSI of the confirmation from the controller UE and the iFC (block 1709). If the S-CSCF determines that it should trigger the controller SCC AS, the S-CSCF may send a message to the controller SCC AS that will result in a reconfiguration of a telephony application server associated with the controller UE (e.g., a telephony application server associated with the first UE) to stop providing services (block 1711). According to an embodiment, the message may be an invite-new message.

A result of the message may be a message from the controller SCC AS that includes an indication to the telephony application server to stop providing services. The S-CSCF may forward the message from the controller SCC AS to the telephony application server.

The S-CSCF may then participate in sharing media with remote parties through a telephony application server that is associated with the second UE (e.g., the controller UE after the change) (block 1713). S-CSCF operations 1700 may then terminate.

If the S-CSCF determines to not trigger the controller SCC AS, then the S-CSCF may reject the request for controller UE change (block 1715). S-CSCF operations 1700 may then terminate.

FIG. 17b illustrates a flow diagram of controller SCC AS operations 1750 in reconfiguring a collaborative session due to a controller UE change. Controller SCC AS operations 1750 may be indicative of operations occurring in a controller SCC AS associated with a controller UE as the controller UE changes from a first UE to a second UE. Controller SCC AS operations 1750 may occur while the controller SCC AS is in a normal operating mode.

Controller SCC AS operations 1750 may begin with the controller SCC AS receiving a message from a control function (block 1755). According to an embodiment, the message from the control function contains an indication to change the controller UE from the first UE to the second UE. Preferably, the message is an invite-new message.

The controller SCC AS may then cause a telephony application server associated with the controller UE to be reconfigured so that it no longer provides services (block 1757). According to an embodiment, the controller SCC AS may cause the telephony application server to reconfigure so that it no longer provides services by sending a message, such as a re-invite message, to the control function, which may forward the message to the telephony application server. The message may include an indicator to the telephony application server to stop providing services.

After reconfiguring the telephony application server, the controller SCC AS may participate in sharing media with remote parties of the collaborative session through a different telephony application server, one that is associated with the second UE (block 1759). Controller SCC AS operations 1750 may then terminate.

Figure 18:
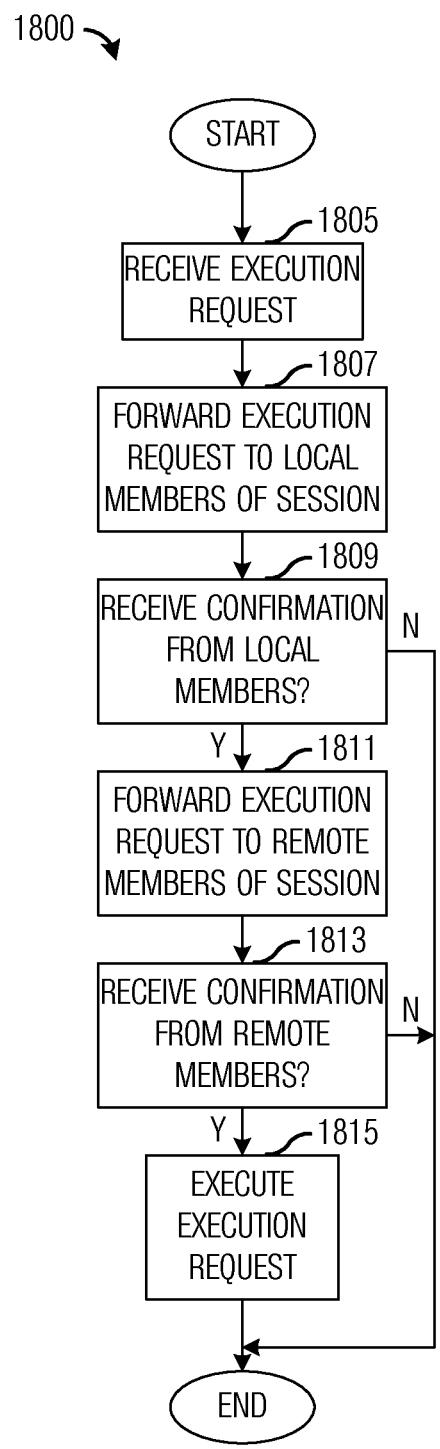
FIG. 18 is a flow diagram of application server operations in executing an execution request.

FIG. 18 illustrates a flow diagram of application server operations 1800 in executing an execution request. Application server operations 1800 may be indicative of operations occurring in an application server serving a collaborative session, wherein a communications devices attempts to execute an operation, such as HOLD, RESUME, or so forth. Application server operations 1800 may occur while the application server is in a normal operating mode.

Application server operations 1800 may begin with the application server receiving a request to execute an operation (block 1805). As discussed previously, the operation may be a HOLD operation that places an existing collaborative session on hold, a RESUME operation that resumes an existing collaborative session that has been placed on hold, or so forth. The request may be initiated by communications devices that are a part of the collaborative session, including controller UE, controlee UEs, or so on.

The application server may forward the request to the local members of the collaborative session (block 1807) and wait until it has received responses from each local member (block 1809). If all responses are affirmative, then the application server may forward the request to the remote members of the collaborative session (block 1811). According to an embodiment, if the request requires no interaction with a telephony application server associated with the controller UE, then the request may be forwarded to the remote members without service from the telephony application server. However, if the request requires interaction with the telephony application server, then the application server may forward the request to the telephony application server, which may then forward the request to the remote members of the collaborative session.

The application server may then wait for responses from the remote members of the collaborative session (block 1813). If the application server did not send the request to the remote members through the telephony application server, the responses from the remote members may be received directly from the remote members. However, if the application server did send the request to the remote members through the telephony application server, then the responses may be received through the telephony application server.

If the responses from the remote members are also affirmative, the application server may execute the operation request (block 1815) and application server operations 1800 may then terminate. If not all responses from the local members or remote members are affirmative, the application server may not allow the operation request to proceed and application server operations 1800 may then terminate.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operations at a first service centralization continuity applications server, wherein the first service centralization continuity applications server is a member of a session, the method comprising:
   receiving, by the first service centralization continuity applications server, a first message to change a controller device from a first user device communicating via the first service centralization continuity applications server to a second user device communicating via a second service centralization continuity applications server, wherein the first user device is associated with a first telephony applications server;
   reconfiguring a signaling path of the session in accordance with the first message, wherein reconfiguring the signaling path comprises adding a second telephony applications server associated with the second user to the signaling path; and
   communicating media with a remote party through the reconfigured signaling path.

2. The method of claim 1, wherein the first message comprises a request to change the controller device from the first user device to the second user device.

3. The method of claim 2, wherein the request initiates a new binding.

4. The method of claim 1, wherein reconfiguring a signaling path further comprises:
   releasing the first telephony applications server associated with the first user device from the signaling path.

5. The method of claim 4, wherein reconfiguring a signaling path comprises sending a re-invite message to a control function.

6. The method of claim 4, wherein reconfiguring a signaling path comprises sending a re-invite message to a control function with a replace header field.

7. The method of claim 4, wherein reconfiguring a signaling path comprises sending an invite-new message to a control function.

8. The method of claim 1, wherein reconfiguring a signaling path further comprises retaining the first telephony applications server associated with the first user device in the signaling path.

9. The method of claim 8, wherein reconfiguring a signaling path comprises sending a re-invite message to a control function.

10. The method of claim 8, wherein the first telephony applications server is reconfigured to stop providing service.

11. The method of claim 1, wherein the second user device initially established the session, and wherein reconfiguring a signaling path further comprises
releasing the first telephony applications server associated with the first user device from the signaling path.

12. The method of claim 11, wherein reconfiguring a signaling path comprises sending an invite-new message to a control function.

13. A system for conducting a multimedia session, the system comprising:
a first service centralization continuity application server configured to:
receive a first message to change a controller device from a first user device associated with the first service centralization continuity application server to a second user device associated with a second service centralization continuity application server, wherein the first user device is associated with a first telephony applications server,
reconfigure a signaling path of the session in accordance with the first message by adding a second telephony applications server associated with the second user device to the signaling path, and
communicate media with a remote party through the signaling path; and
the second service centralization continuity application server configured to send the first message to change the controller device from the first user device to the second user device.

14. The system of claim 13, wherein the first message comprises a request to change the controller device from the first user device to the second user device.

15. The system of claim 14, wherein the first controller application server is further configured to initiate a new binding in accordance with the request.

16. The system of claim 13, wherein the first controller application server configured to reconfigure the signaling path further comprises the first service centralization continuity application server configured to:
release the first telephony applications server associated with the first user device from the signaling path.

17. The system of claim 16, wherein the first service centralization continuity application server configured to reconfigure the signaling path further comprises the first service centralization continuity application server configured to send a re-invite message or an invite-new message to a control function.

18. The system of claim 13, wherein the first service centralization continuity application server configured to reconfigure the signaling path further comprises the first service centralization continuity application server configured to retain the first telephony applications server associated with the first user device in the signaling path.

19. The system of claim 13, wherein the first service centralization continuity application server configured to reconfigure the signaling path further comprises the first service centralization continuity application server configured to:
when the second user device initially established the session:
add the second telephony applications server associated with the second device user to the signaling path; and
release the first telephony applications server associated with the first user device from the signaling path.

20. A computer program product for conducting a multimedia session, the computer program product having a non-transitory computer-readable medium with a computer program embodied thereon, the computer program comprising computer program code for:
receiving, by the first service centralization continuity application server, a first message to change a controller device from a first user device associated with the first service centralization continuity application server to a second user device associated with a second service centralization continuity application server, wherein the first user device is associated with a first telephony applications server,
reconfiguring a signaling path of the session in accordance with the first message, wherein reconfiguring the signaling path comprises adding a second telephony applications server associated with the second user device to the signaling path, and
communicating media with a remote party through the signaling path.

21. The computer program product of claim 20, wherein the first message comprises a request to change the controller device from the first user device to the second user device.

22. The computer program product of claim 21, wherein the computer program further comprises computer program code for initiating a new binding in accordance with the request.

23. The computer program product of claim 20, wherein the computer program code for reconfiguring the signaling path further comprises computer program code for:
releasing the first telephony applications server associated with the first user device from the signaling path.

24. The computer program product of claim 23, wherein the computer program code for reconfiguring the signaling path further comprises computer program code for sending a re-invite message or an invite-new message to a control function.

25. The computer program product of claim 21, wherein the computer program code for reconfiguring the signaling path further comprises computer program code for and retaining the first telephony applications server associated with the first user device in the signaling path.

26. The computer program product of claim 21, wherein the computer program code for reconfiguring the signaling path further comprises computer program code for:
when the second user device initially established the session:
adding the second telephony applications server associated with the second user device to the signaling path; and
releasing the first telephony applications server associated with the first user device from the signaling path.

* * * * *